US012707356B2

(12) United States Patent
Lunardi et al.

(10) Patent No.: US 12,707,356 B2
(45) Date of Patent: Aug. 11, 2026

(54) HANDLING OF QUALITY-OF-EXPERIENCE (QoE) MEASUREMENT STATUS

(71) Applicant: Telefonaktiebolaget LM Ericsson (publ), Stockholm (SE)

(72) Inventors: Luca Lunardi, Genoa (IT); Ali Parichehrehteroujeni, Linköping (SE); Filip Barac, Huddinge (SE); Cecilia Eklöf, Täby (SE); Johan Rune, Lidingö (SE); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 18/274,866

(22) PCT Filed: Jan. 31, 2022

(86) PCT No.: PCT/SE2022/050097
§ 371 (c)(1),
(2) Date: Jul. 28, 2023

(87) PCT Pub. No.: WO2022/164380
PCT Pub. Date: Aug. 4, 2022

(65) Prior Publication Data

US 2024/0089819 A1 Mar. 14, 2024

Related U.S. Application Data

(60) Provisional application No. 63/144,202, filed on Feb. 1, 2021.

(51) Int. Cl.

| | |
|---|---|
| ***H04W 36/00*** | (2009.01) |
| ***H04W 24/08*** | (2009.01) |
| ***H04W 24/10*** | (2009.01) |

(52) U.S. Cl.
CPC ....... *H04W 36/0094* (2013.01); *H04W 24/08* (2013.01); *H04W 24/10* (2013.01); *H04W 36/0069* (2018.08)

(58) Field of Classification Search
CPC . H04W 36/0094; H04W 24/08; H04W 24/10; H04W 36/0069
See application file for complete search history.

(56) References Cited

U.S. PATENT DOCUMENTS

| | | | | |
|---|---|---|---|---|
| 12,302,177 | B2 * | 5/2025 | Liu .................. | H04W 36/0022 |
| 2020/0092762 | A1 | 3/2020 | Shi et al. | |

(Continued)

FOREIGN PATENT DOCUMENTS

| | | | |
|---|---|---|---|
| EP | 3796744 | A1 | 3/2021 |
| KR | 20190143782 | A | 12/2019 |
| WO | 2015098951 | A1 | 7/2015 |

OTHER PUBLICATIONS

Unknown, Author , "Discussion on QoE measurement configuration and reporting", 3GPP TSG RAN Meeting #113-e, R2-2101189, Online, Jan. 25-Feb. 5, 2021, 1-13.

(Continued)

*Primary Examiner* — Deepa Belur
(74) *Attorney, Agent, or Firm* — Murphy, Bilak & Homiller, PLLC

(57) ABSTRACT

Techniques for managing quality-of-experience (QoE) measurements by a user equipment (UE). An example method, in a first node in a radio access network (RAN), comprises transmitting (1010), to a second node in the RAN, status information for measurements associated to one or more QoE measurements configured for the UE by the first node. The second node may be associated with the first node with respect to at least one of the following: changing a configuration for the UE for dual connectivity; mobility of the UE; RRC resume or RRC reestablishment of the UE; and switch- (Continued)

ing the transfer of data for the service from a path going to the UE via the first RAN node to a path going to the UE via the second RAN node.

24 Claims, 9 Drawing Sheets

(56) References Cited

U.S. PATENT DOCUMENTS

| | | | | |
|---|---|---|---|---|
| 2020/0413301 | A1* | 12/2020 | Shi | H04W 36/08 |
| 2021/0274587 | A1* | 9/2021 | Jung | H04W 76/15 |
| 2022/0046503 | A1* | 2/2022 | Kumar | H04W 28/24 |
| 2022/0417780 | A1* | 12/2022 | Liu | H04W 24/10 |
| 2023/0308925 | A1* | 9/2023 | Hu | H04W 24/08 |
| 2024/0089819 | A1* | 3/2024 | Lunardi | H04W 36/0069 |
| 2024/0098532 | A1* | 3/2024 | Rune | H04W 24/08 |

OTHER PUBLICATIONS

Unknown, Author , "Discussion on radio related measurements and information in NR QoE", 3GPP TSG-RAN3 Meeting #111-e, R3-210509, Electronic meeting, Jan. 25-Feb. 4, 2021, 1-8.

Unknown, Author , "pCR for TR 38.890: Handling of QoE Measurement and Reporting and Support for New Services", 3GPP TSG-RAN WG3 Meeting #111-e, R3-210527, Online, Jan. 25-Feb. 4, 2021, 1-19.

Unknown, Author , "pCR for TR 38.890: QoE Support for Network Slicing", 3GPP TSG-RAN WG3 Meeting #111-e, R3-210530, Online, Jan. 25-Feb. 4, 2021, 1-9.

3GPP , "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

3GPP , "3rd Generation Partnership Project; Technical Specification Group Radio Access Network; Evolved Universal Terrestrial Radio Access Network (E-UTRAN); S1 Application Protocol (S1AP) (Release 16)", 3GPP TS 36.413 V16.3.0, 2020-09, 1-422.

3GPP , "3rd Generation Partnership Project; Technical Specification Group Radio Access Network; Evolved Universal Terrestrial Radio Access Network (E-UTRAN); X2 application protocol (X2AP) (Release 16)", 3GPP TS 36.423 V16.3.0, 2020-09, 1-496.

3GPP , "3rd Generation Partnership Project; Technical Specification Group Radio Access Network; NR; Radio Resource Control (RRC) protocol specification (Release 16)", 3GPP TS 38.331 V16.3.0, Dec. 2020, 1-932.

3GPP , "3rd Generation Partnership Project; Technical Specification Group Services and System Aspects; System architecture for the 5G System (5GS); Stage 2 (Release 16)", 3GPP TS 23.501 V16.7.0, Dec. 2020, 1-450.

3GPP , "3rd Generation Partnership Project; Technical Specification Group Services and System Aspects; Telecommunication management; Quality of Experience (QoE) measurement collection; Control and configuration (Release 16)", 3GPP TS 28.405 V16.0.0, Jul. 2020, 1-16.

Unknown, Author , "Potential RAN3 impacts about QoE measurement", 3GPP TSG-RAN WG3 #109-e, R3-205283, E-Meeting, Aug. 17-28, 2020, 1-6.

Unknown, Author , "QoE measurement collection additions", 3GPP TSG RAN2 Meeting #110, R2-2004624, Electronic meeting, Jun. 1-12, 2020, 1-80.

* cited by examiner

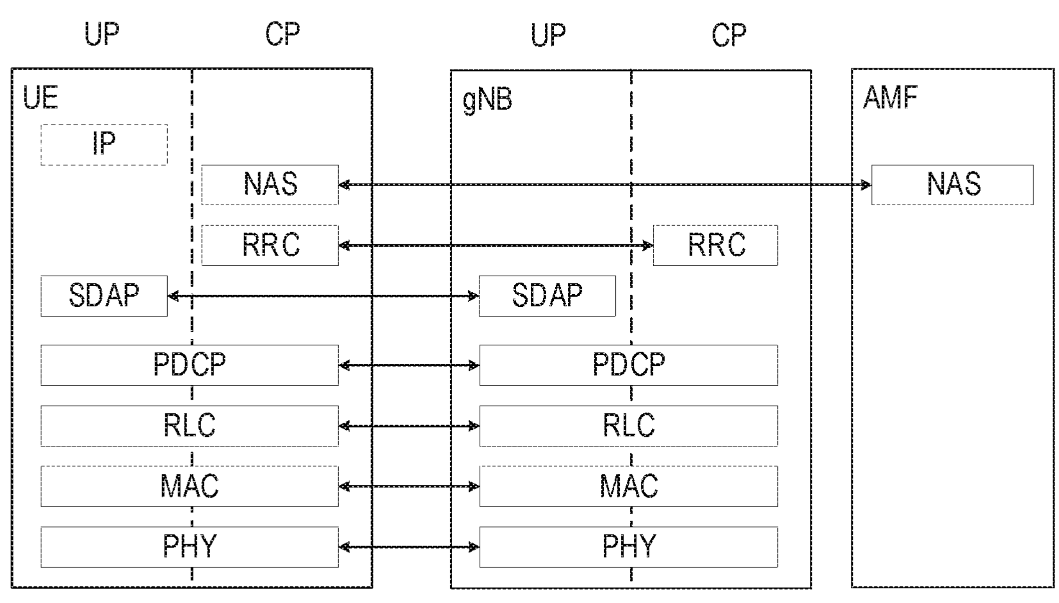
FIG. 6
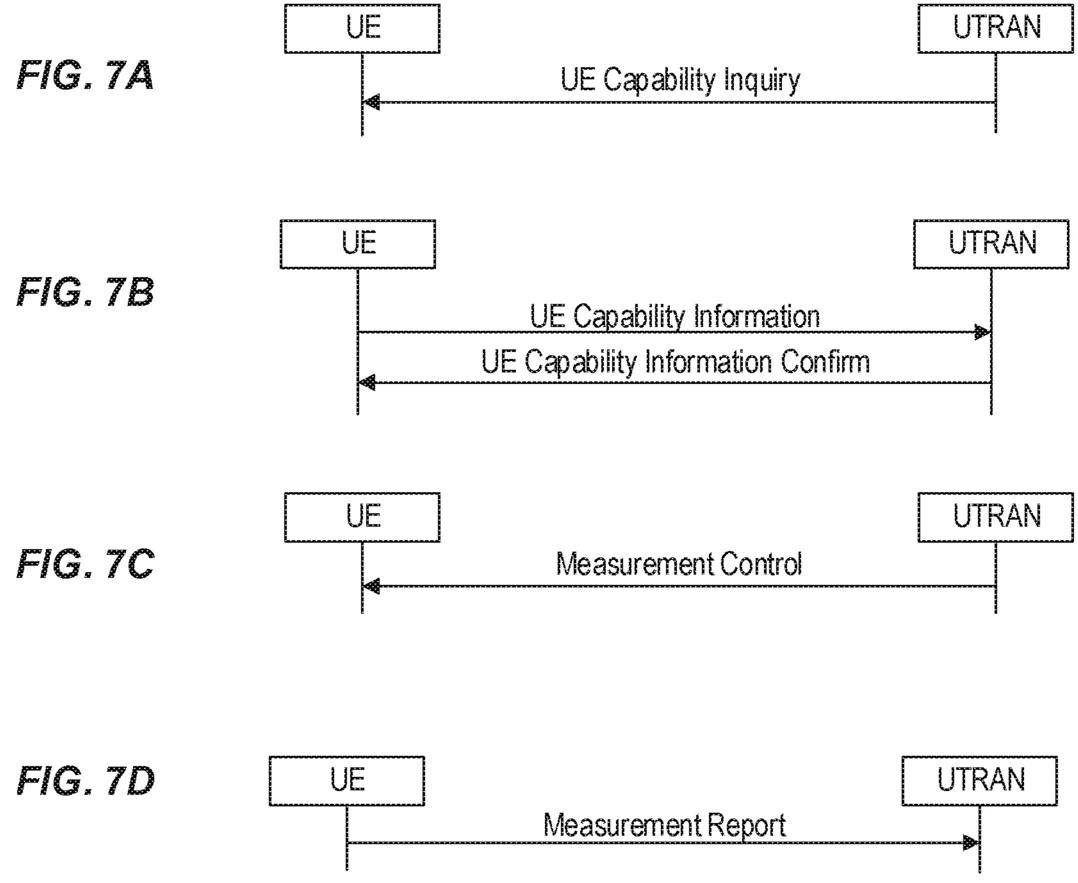

```
MeasParameters-v1530 ::=          SEQUENCE {
       qoe-MeasReport-r15                 ENUMERATED {supported}     OPTIONAL,
       qoe-MTSI-MeasReport-r15            ENUMERATED {supported}     OPTIONAL,
       ca-IdleModeMeasurements-r15        ENUMERATED {supported}     OPTIONAL,
       ca-IdleModeValidityArea-r15        ENUMERATED {supported}     OPTIONAL,
       heightMeas-r15                     ENUMERATED {supported}     OPTIONAL,
       multipleCellsMeasExtension-r15     ENUMERATED {supported}     OPTIONAL
}

MeasParameters-v16xy ::=          SEQUENCE {
       qoe-Extensions-r16                 ENUMERATED {supported}     OPTIONAL
}
```

FIG. 8A

```
-- ASN1START
QoE-Reference-r16 ::=       SEQUENCE {
       plmn-Identity-r16       PLMN-Identity,
       qmc-Id-r16              OCTET STRING (SIZE (3))
}
-- ASN1STOP
```

FIG. 8B

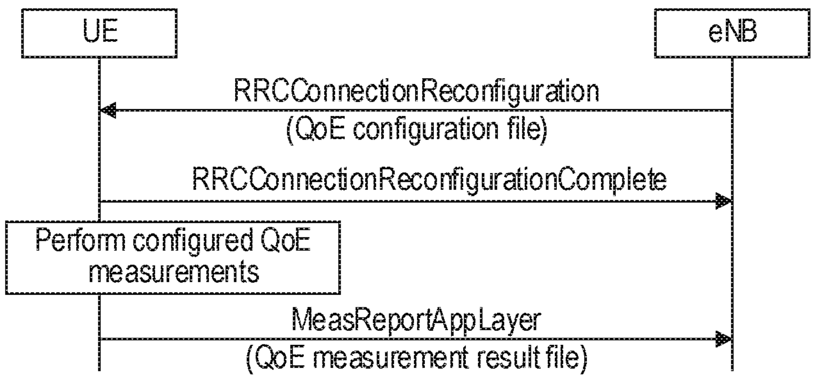

*FIG. 9A*

```
measConfigAppLayer-r15 CHOICE {
   release                        NULL,
   setup                          SEQUENCE{
       measConfigAppLayerContainer-r15   OCTET STRING (SIZE(1..1000)),
       serviceType-r15                   ENUMERATED {qoe, qoemtsi, spare6,
                                                  spare5, spare4, spare3, spare2, spare1}
}
```

*FIG. 9B*

```
-- ASN1START
MeasReportAppLayer-r15 ::=           SEQUENCE {
    criticalExtensions                  CHOICE {
        measReportAppLayer-r15                 MeasReportAppLayer-r15-IEs,
        criticalExtensionsFuture               SEQUENCE {}
    }
}
MeasReportAppLayer-r15-IEs ::=       SEQUENCE {
        measReportAppLayerContainer-r15 OCTET STRING (SIZE(1..8000))           OPTIONAL,
        serviceType-r15                   ENUMERATED {qoe, qoemtsi, spare6, spare5, spare4,
                                                spare3, spare2, spare1}        OPTIONAL,
        nonCriticalExtension              MeasReportAppLayer-v1590-IEs         OPTIONAL
}
MeasReportAppLayer-v1590-IEs ::=     SEQUENCE {
    lateNonCriticalExtension              OCTET STRING                         OPTIONAL,
    nonCriticalExtension                  MeasReportAppLayer-IEs-v18xy         OPTIONAL
}
-- ASN1STOP
```

*FIG. 9C*

HANDLING OF QUALITY-OF-EXPERIENCE (QoE) MEASUREMENT STATUS

TECHNICAL FIELD

The present invention generally relates to wireless communication networks and particularly relates to efficient techniques for configuring, performing, and reporting various quality-of-experience (QoE) measurements by user equipment (UE) in a wireless network.

BACKGROUND

Long-Term Evolution (LTE) is an umbrella term for the so-called fourth-generation (4G) radio access technologies developed within the Third-Generation Partnership Project (3GPP) and initially standardized in Release 8 (Rel-8) and Release 9 (Rel-9) LTE, which is also known as Evolved UMTS Radio Access Network (E-UTRAN) is targeted at various licensed frequency bands and is accompanied by improvements to non-radio aspects commonly referred to as System Architecture Evolution (SAE), which includes the Evolved Packet Core (EPC) network. LTE continues to evolve through subsequent releases.

3GPP LTE Release 10 (Rel-10) supports bandwidths larger than 20 MHz. One important Rel-10 requirement is backward compatibility with LTE Rel-8, including spectrum compatibility. Thus, a wideband LTE Rel-10 carrier (e.g., wider than 20 MHz) should appear as a plurality of carriers ("component carriers" or CCs) to an LTE Rel-8 ("legacy") terminal. Legacy terminals can be scheduled in all parts of the wideband LTE Rel-10 carrier. One way to achieve this is by Carrier Aggregation (CA), whereby a Rel-10 terminal can receive multiple CCs, each preferably having the same structure as a Rel-8 carrier. Additionally, LTE Rel-12 introduced dual connectivity (DC) whereby a UE can be connected to two network nodes simultaneously, thereby improving connection robustness and/or capacity.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

5G/NR technology shares many similarities with LTE. For example, NR uses CP-OFDM (Cyclic Prefix Orthogonal Frequency Division Multiplexing) in the downlink (DL, i.e., transmissions from the network) and both CP-OFDM and DFT-spread OFDM (DFT-S-OFDM) in the uplink (UL, i.e., transmissions to the network). As another example, in the time domain, NR DL and UL physical resources are organized into equal-sized 1-ms subframes. A subframe is further divided into multiple slots of equal duration, with each slot including multiple OFDM-based symbols.

However, time-frequency resources can be configured much more flexibly for an NR cell than for an LTE cell. Furthermore, In addition to providing coverage via cells as in LTE, NR networks also provide coverage via "beams." In general, a DL "beam" is a coverage area of a network-transmitted reference signal (RS) that may be measured or monitored by a user equipment (UE, e.g., wireless communication device).

Quality of Experience (QoE) measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE. QoE measurements will also be needed for UEs operating in NR networks, and thus QoE measurements are being specified for NR.

The solutions in LTE and UMTS are similar, with the overall principles as follows. Quality of Experience Measurement Collection (QMC) enables configuration of application layer measurements in the UE and transmission of QoE measurement results by means of Radio Resource Control (RRC) signalling. An application layer measurement configuration received from OAM or the core network (CN) is encapsulated in a transparent container, which is forwarded to the UE in a downlink RRC message. Application layer measurements received from the UE's higher layer are encapsulated in a transparent container and sent to the network in an uplink RRC message. The result container is forwarded to a Trace Collector Entity (TCE).

A new study item for "Study on NR QoE management and optimizations for diverse services" has been approved for NR Rel-17. The purpose is to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

Radio Resource Control (RRC) signaling is used to configure application layer measurements in UEs and to collect QoE measurement result files from the configured UEs. In particular, an application layer measurement configuration from a core network (e.g., EPC) or a network operations/administration/maintenance (OAM) function (also referred to as "network management system" or "NMS") is encapsulated in a transparent container and sent to a UE's serving RAN node, which forwards it to the UE in an RRC message. Application layer measurements made by the UE are encapsulated in a transparent container and sent in an RRC message to the serving RAN node, which forwards the container to a Trace Collector Entity (TCE) or a Measurement Collection Entity (MCE) associated with the core network.

The measurements may be initiated towards RAN in a management-based manner, i.e., from an O&M node, in a generic way, e.g., for a group of UEs, or they may also be initiated in a signaling-based manner, i.e., initiated from CN to RAN, e.g., for a single UE. The configuration of the measurement includes the measurement details, which is encapsulated in a container that is transparent to RAN.

When initiated via the core network, the measurement is started towards a specific UE. For the LTE case, the "TRACE START" S1AP message is used, which carries, among other things, details about the measurement configuration the application should collect (in the "Container for application layer measurement configuration" information element, transparent to the RAN) and the details to reach the trace collection entity to which the measurements should be sent.

The RAN is not aware of when the streaming session is ongoing in the UE Access Stratum and is also not aware of when the measurements are ongoing. It is an implementation decision when RAN stops the measurements. Typically, it is done when the UE has moved outside the measured area.

One opportunity provided by legacy solutions is also to be able to keep the QoE measurement for the whole session, even during handover situation. Further background of the LTE (E-UTRAN) solutions is provided below.

E-UTRAN—Application Layer Measurement Capabilities

For E-UTRAN, the UE capability transfer is used to transfer UE radio access capability information from the UE to E-UTRAN. This is shown in FIG. 1.

The UE-EUTRA-Capability information element (IE) is used to convey the E-UTRA UE Radio Access Capability Parameters and the Feature Group Indicators for mandatory features to the network.

In the response message "UECapabilityInformation," the UE can include the "UE-EUTRA-Capability" IE. The "UE-EUTRA-Capability" IE may include the UE-EUTRA-Capability-v1530-IE, which can be used by the UE to indicate whether the UE supports QoE Measurement Collection for streaming services and/or MTSI services, as detailed in the "MeasParameters-v1530" encoding below.

The contribution CR 4297 (R2-2004624) for 3GPP TS 36.331 v16.0.0 at the 3GPP TSG RAN2 Meeting #110 proposed an extension of the "UE-EUTRA-Capability" IE that may include, within the "UE-EUTRA-Capability-v16xy-IE," a "measParameters-v16xy" comprising the qoe-Extensions-r16 IE. The qoe-Extensions-r16 IE may be used to indicate whether the UE supports the Release 16 extensions for QoE Measurement Collection, i.e., whether the UE supports more than one QoE measurement type at a time and whether the UE supports the signaling of withinArea, sessionRecordingIndication, qoe-Reference, temporary StopQoE and restartQoE.

E-UTRAN—Application Layer Measurement Reporting

The purpose of the "Application layer measurement reporting" procedure described in 3GPP TS 36.331 and shown in FIG. 2 is to inform E-UTRAN about application layer measurement report.

A UE capable of application layer measurement reporting in RRC_CONNECTED may initiate the procedure when configured with application layer measurement, i.e., when measConfigAppLayer has been configured by E-UTRAN.

Upon initiating the procedure, the UE shall:

1> if configured with application layer measurement, and SRB4 is configured, and the UE has received application layer measurement report information from upper layers:

2> set the measReportAppLayerContainer in the MeasReportAppLayer message to the value of the application layer measurement report information;

2> set the serviceType in the MeasReportAppLayer message to the type of the application layer measurement report information;

2> submit the MeasReportAppLayer message to lower layers for transmission via SRB4.

E-UTRAN—QoE Measurement Configuration Setup and Release—RRC Signaling

The RRCConnectionReconfiguration message is used to reconfigure the UE to setup or release the UE for Application Layer measurements. This is signaled in the measConfigAppLayer-15 IE within the "OtherConfig" IE.

The setup includes the transparent container measConfigAppLayerContainer which specifies the QoE measurement configuration for the application of interest and the serviceType IE to indicate the application (or service) for which the QoE measurements are being configured. Supported services are streaming and MTSI.

The contribution CR 4297 (R2-2004624) for 3GPP TS 36.331 v16.0.0 at the 3GPP TSG RAN2 Meeting #110 proposed to extend the QoE measurement configuration.

The measConfigAppLayerToAddModList-r16 may be used to add or modify multiple QoE measurement configurations (up to maxQoE-Measurement-r16). The measConfigAppLayerToReleaseList-r16 IE may be used to remove multiple QoE measurement configuration (up to maxQoE-Measurement-r16).

E-UTRAN—QoE Measurement Reporting—RRC Signaling

As specified in 3GPP TS 36.331, the MeasReportAppLayer RRC message is used by the UE to send to the E-UTRAN node the QoE measurement results of an application (or service). The service for which the report is being sent is indicated in the "serviceType" IE.

The contribution CR 4297 (R2-2004624) for 3GPP TS 36.331 v16.0.0 at the 3GPP TSG RAN2 Meeting #110 proposed to extend the MeasReportAppLayer IEs introducing a QoE reference comprising the PLMN identity and the identifier of the QoE Measurement Collection.

For E-UTRAN, an example of desired UE behavior for application-layer measurement reporting is described in CR 4297 (R2-2004624).

UE Application Layer Measurement Configuration

The "UE Application layer measurement configuration" IE is described in 3GPP TS 36.413 v16.3.0 and TS 36.423 v16.3.0.

Area Scope for QoE Measurements

According to 3GPP TS 28.405, the area scope parameter defines the area in terms of cells or Tracking Area/Routing Area/Location Area where the QoE Measurement Collection (QMC) shall take place. If the parameter is not present, the QMC shall be done throughout the PLMN specified in PLMN target.

The area scope parameter in UMTS is either:

List of cells, identified by CGI. Maximum 32 CGI can be defined.

List of Routing Area, identified by RAI. Maximum of 8 RAIs can be defined.

List of Location Area, identified by LAI. Maximum of 8 LAIs can be defined.

The area scope parameter in LTE is either:

list of cells, identified by E-UTRAN-CGI. Maximum 32 CGI can be defined.

List of Tracking Area, identified by TAC. Maximum of 8 TAC can be defined.

The parameter is mandatory if area based QMC is requested.

SUMMARY

Embodiments of the techniques and apparatuses described herein enable a coordinated handling, between RAN nodes, of QoE measurements and associated radio related measurements (such as MDT measurements) configured for a UE, where the handling pertains to the following connectivity procedures pertaining to this UE: Dual Connectivity, mobility, RRC resume and RRC reestablishment.

Some embodiments of the present disclosure include example methods (e.g., procedures) for managing quality-of-experience (QoE) measurements in a radio access network (RAN). These example methods can be performed by a user equipment (UE, e.g., wireless device, IoT device, modem, etc.) in communication with a radio access network (RAN) node (e.g., base station, eNB, gNB, ng-eNB, en-gNB, etc.).

An example method according to some of the embodiments described herein is carried out by a first node in a radio access network (RAN), for managing quality-of-experience (QoE) measurements by a user equipment (UE). This example method includes the step of transmitting, to a second node in the RAN, status information for measurements associated to one or more QoE measurements configured for the UE by the first node.

A corresponding method according to some of the embodiments described herein is carried out by a second node in a radio access network (RAN), for managing quality-of-experience (QoE) measurements by a user equipment (UE). This example method includes the step of receiving, from a second node in the RAN, status information for measurements associated to one or more QoE measurements configured for the UE by the first node.

Other embodiments include a method for a user equipment (UE) for handling configurations of quality-of-experience (QoE) measurements in a radio access network (RAN). This example method includes the steps of receiving, from a RAN node, a QoE measurement configuration (QMC) for one or more service types or applications, and determining that the UE already has a QoE configuration for the same service type or application. The method further includes, upon said determining, taking one or more of the following actions: discarding the new configuration; releasing the old configuration and configuring itself and the upper layers with the new configuration; suspending the new configuration; suspending the old configuration and activating the new configuration; if the old configuration is already in a suspended state when the new configuration is received, keeping the new configuration active and either releasing the old configuration or keeping the old configuration suspended; if the type of the services/applications or a subtype of services is specified by the new QoE configuration, configuring itself and the upper layers of the targeted type or subtype of the services and/or targeted applications with the mentioned services and keeping the old configuration for the rest of the applications; in a dual connectivity scenario, if one of the QoE configurations was received from a master node while the other was received from a secondary node, releasing the QoE configuration received from the secondary node and keeping the QoE configuration received from the master node; in a dual connectivity scenario, if one of the QoE configurations was received from a master node while the other was received from a secondary node, suspending the QoE configuration received from the secondary node and keeping the QoE configuration received from the master node active; if an ongoing application session of the type of service and/or subtype of service that the QoE configurations target (or all such ongoing applications sessions in case more than one is ongoing) is currently using radio bearer(s) towards the RAN node from which the old configuration was received, keeping the old configuration and either releasing or suspending the new configuration; and if an ongoing application session of the type of service and/or subtype of service that the QoE configurations target (or all such ongoing applications sessions in case more than one is ongoing) is currently using radio bearer(s) towards the RAN node from which the new configuration was received, keeping the new configuration and either releasing or suspending the old configuration.

The disclosed techniques and apparatuses enable a consistent handling for QoE measurements and for radio related measurements (such as MDT) associated to QoE measurements, in scenarios where more than one RAN nodes are involved in connectivity procedures concerning a wireless terminal or a group of wireless terminals.

These and other objects, features, and advantages of embodiments of the present disclosure will become apparent upon reading the following Detailed Description in view of the Drawings briefly described below.

BRIEF DESCRIPTION OF THE DRAWINGS

FIG. 6 shows an example configuration of NR user plane (UP) and control plane (CP) protocol stacks.

FIGS. 7A, 7B, 7C and 7D show various procedures between a UTRAN and a UE for quality-of-experience (QoE) measurements in a legacy UMTS network.

FIGS. 8A and 8B illustrate various aspects of QoE measurement configuration for a UE in an LTE network.

FIGS. 9A, 9B and 9C illustrate various aspects of QoE measurement collection for a UE in an LTE network.

DETAILED DESCRIPTION

Figure 1:
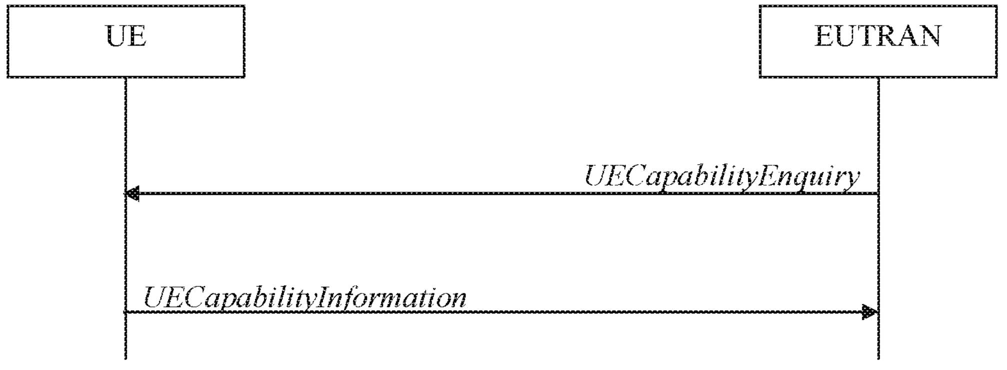
FIG. 1 illustrates UE capability transfer in LTE (E-UTRAN).

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

Furthermore, the following terms are used throughout the description given below:

- Radio Node: As used herein, a "radio node" can be either a "radio access node" or a "wireless device."
- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node. Thus, the term "RAN node" may apply to any of, for example: gNB, eNB, en-gNB, ng-eNB, gNB-CU, gNB-CU-CP, gNB-CU-UP, eNB-CU, eNB-CU-CP, eNB-CU-UP, IAB-node, IAB-donor DU, IAB-donor-CU, IAB-DU, IAB-MT, O-CU, O-CU-CP, O-CU-UP, O-DU, O-RU, O-eNB.
- Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.
- Wireless Device: As used herein, a "wireless device" (or "WD" for short) is any type of device can obtain access to (i.e., to be served by) a cellular communications network by communicating wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).
- Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.
- The terms "QoE measurement report", "QoE report", "measurement report" and "report" are used interchangeably.

The terms "QoE measurement configuration", "QoE measurement", "QoE configuration" and "application layer measurement configuration" are used interchangeably.

The terms "service" and "application" are used interchangeably.

The terms "MCE" and "TCE" are used interchangeably.

Note that the description herein focuses on a 3GPP cellular communications system and, thus 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, accordingly, concepts described herein apply equally to both cells and beams.

As briefly summarized above, it has been agreed for 3GPP Rel-17 to provide RAN nodes visibility into QoE reports so that RAN nodes can adapt various aspects of their performance based on UE QoE measurements. However, there are various problems, issues, and/or difficulties in adapting conventional QoE measurements for use by RAN nodes in this manner. This is discussed in more detail below, after the following description of LTE and NR network architectures.

One approach to handling QoE measurements for a UE when setting up and operating in dual connectivity, with a first network node acting as MN and a second network node acting as SN, might comprise the following steps, as performed by a first RAN node:

- Creating QoE configurations for the UE; and
- Sending all or part of the QoE configuration to the UE;
- Sending all or part of the QoE configurations to the second network node when setting up or reconfiguring the SN, wherein the SN related and MN related QoE configuration may be different;
- Possibly receiving QoE measurement result data from the second network node.

This approach might also fulfil the requirement that measurements should continue until the end of the session, even if the UE moves outside the area during the session—this can be done, for example, by having the network control the start and stop of the measurements due to area updates. In one approach, for example, the network might send the release command to release the QoE measurements. A session feedback indication may be used by the network as a help to know when to stop the measurements, for example. These approaches may be used, for example, if the UE performs handover or re-establishes its connection to a cell controlled by a node that is outside of the configured area.

However, using this approach leaves some problems unresolved. For example, in some scenarios, where a first RAN node and a second RAN node are both involved in connectivity procedures concerning a wireless terminal/UE (such as MR-DC, mobility, resume and re-establishment), and the first RAN node configured the wireless terminal for QoE measurements, the second RAN node is unaware of:

- status information of the QoE measurements configured for the wireless terminal,
- status of radio measurements (such as MDT) configured for the wireless terminal and associated to the QoE measurements,
- actions to be performed concerning the QoE measurements configured for the wireless terminal, and
- actions to be performed concerning radio measurements (such as MDT) configured for the wireless terminal and associated to the QoE measurements.

Since the second RAN node is unaware of the status and actions described above, it may happen that the second node tampers with (e.g., overwrites) an ongoing QoE measurement configured for the UE.

In this document, solutions are introduced to enable a coordinated handling, between RAN nodes, of QoE measurements and associated radio related measurements (such as MDT measurements) configured for a UE, where the handling pertains to the following connectivity procedures pertaining to this UE: Dual Connectivity, mobility, RRC resume and RRC reestablishment.

Non-limiting examples of applicability for the proposed solution are listed below, where status information concerning already configured QoE measurements is sent from one RAN node to another RAN node. Examples of status information are one of more of the following:

- an identification of the QoE measurement configuration and corresponding configuration details;
- information of whether the measurement configuration is active, suspended, to be resumed, to be stopped, not activated;
- a time remaining for the QoE measurement collection process, after which the process is stopped;
- a list of network slice identifiers for which the QoE measurements for the configuration in question are collected;
- the MDT measurement configuration coupled to the QoE measurement configuration in question
- The size of the QoE measurement report to be signalled to the TCE
- The period with which the QoE measurement report should be signalled to the TCE
- An indication, signalled together with a QoE report, stating whether the QoE report has been already signalled to the TCE.

Example 1): An MR-DC capable UE is initially configured with single connectivity towards a first cell served by a first RAN node. Furthermore, there exists a second RAN node, serving a second cell that is available for serving the UE, but the UE is not configured for connecting also to this cell, i.e., it is not configured for MR-DC operation from the beginning (the reason for that can be implementation specific). Alternatively, there exists a second RAN node, serving a second cell that is not available for serving the UE, e.g., due to an energy saving policy. At initial connection setup to the first cell, or after that, the first RAN node sends an RRC message with QoE configuration to the UE for QoE measurements. Later on, the second cell served by the second RAN node becomes available and the UE is reconfigured for MR-DC operation using two cells, wherein one cell is the second cell of the second RAN node, and the other cell is the first cell of the first RAN node or a third cell of a third RAN node. During the reconfiguration from single connectivity to dual connectivity, information concerning the status of previously configured QoE measurements is sent from the first RAN node to the second RAN node. If the dual connectivity comprises a third cell of a third RAN node, the first RAN node sends the status of previously configured QoE measurements to the third RAN node.

1. As an example, for EN-DC, a UE initially configured with single LTE connectivity towards a first E-UTRA cell of a first eNB, and it exists a second NR cell served by a second gNB that is available but not used (or alternatively the second NR cell is not available). The eNB sends an RRC message with QoE configuration to the UE for QoE measurement. Later on, the UE is reconfigured for EN-DC. The status of the QoE configuration is sent from the first eNB to the second gNB.
2. For NR-DC, another example is a UE initially configured with single NR connectivity towards a first NR cell of a first gNB, and it exists a second NR cell served by a second gNB that is available but not used (or alternatively the second NR cell is not available). The first gNB sends an RRC message with QoE configuration to the UE for QoE measurement. Later on, the UE is reconfigured for NR-DC. The status of the QoE configuration is sent from the first gNB to the second gNB.

Example 2): An MR-DC capable UE is initially configured in dual connectivity towards a first cell served by a first RAN node and a second cell served by a second RAN node. At initial connection setup or during the lifetime of the connection, the first RAN node sends an RRC message with QoE configuration to the UE for QoE measurements. After that, a third cell, served by a third RAN node becomes available and the UE configuration is changed, either replacing the first cell of the first RAN node with the third cell of the third RAN node or replacing the second cell of the second RAN node with the third cell of the third RAN node. The status of the QoE configuration is sent from the first RAN node to the third RAN node or from the second RAN node to the third RAN node.

Example 3): A UE is in single connectivity towards a first RAN node or in dual connectivity towards a first RAN node and a second RAN node. The first RAN node sends an RRC message with QoE configuration to the UE for QoE measurements. Later on, the UE performs mobility towards a cell served by a third RAN node. The status of the QoE configuration is sent from the first RAN node to the third RAN node.

Example 4): An UE in single connectivity towards a first RAN node or in dual connectivity towards a first RAN node and a second RAN node. A first RAN node sends an RRC message with QoE configuration to the UE for QoE measurements and optionally sends the status of the QoE measurements to the second RAN node. A first RAN node (and optionally a second RAN node in case of dual connectivity) retains the status of the QoE configuration for the UE. Later on, the UE is transitioned to RRC Inactive. The UE then performs RRC resume in a cell served by a third RAN node. The third RAN node retrieves from the first RAN node the status of the QoE configuration for the UE (and in case of dual connectivity prior to the transition to Inactive, the QoE configuration can be retrieved from the second RAN node).

Example 5): A UE in single connectivity towards a first RAN node or in dual connectivity towards a first RAN node and a second RAN node. A first RAN node sends an RRC message with QoE configuration to the UE for QoE measurements and optionally sends the status of the QoE measurements to the second RAN node. A first RAN node (and optionally in case of dual connectivity a second RAN node) retains the status of the QoE configuration for the UE. Later on, e.g., following a Radio Link Failure, the UE performs RRC Reestablishment towards a cell served by a third RAN node. The third RAN node fetches the status of the QoE configuration for the UE from the first RAN node (and in case of dual connectivity prior to the Reestablishment, potentially from the second RAN node).

Example 6) A UE is configured with dual connectivity (EN-DC or NR-DC) towards the first RAN node and the second RAN node. The data for application session of a service for which the QoE measurements are desired is carried to the UE via the first RAN node and the first RAN node sends an RRC message with QoE configuration to the UE for QoE measurements. Later on, the data for application session of a service for which the QoE measurements are configured is, instead of being sent to/from the UE via the first RAN node, reconfigured to be sent to the UE via the second RAN node. The status of the QoE configuration is sent from the first RAN node to the second RAN node.

Each of the above examples 1)-6) describes an example of the events pertaining to one UE. Moreover, the signalling procedures pertaining to e.g., Dual Connectivity, mobility, RRC resume and RRC reestablishment are typically executed for one UE at a time. However, the actions described in this document are equally applicable to events that are simultaneously affecting a group of UEs, in the case of which the QoE configuration status transfer between two RAN nodes may be done simultaneously (e.g., in the same message) for multiple UEs and their QoE configurations. One example of an event where a group of UEs is affected is load balancing, where a group of UEs is simultaneously migrated from one IAB donor CU to another IAB donor CU.

Figure 3:
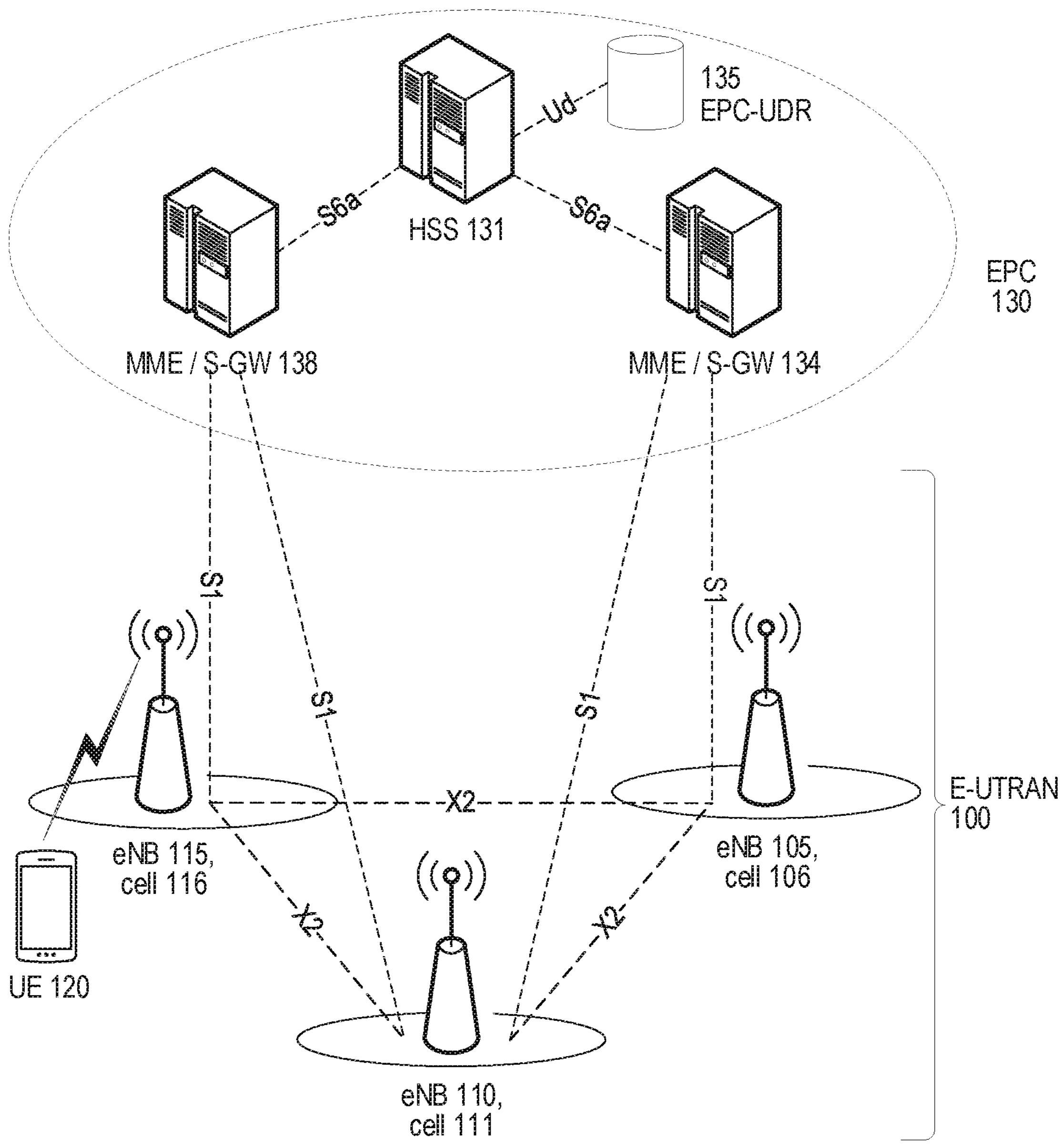
FIG. 3 is a high-level block diagram of an example architecture of the Long-Term Evolution (LTE) Evolved UTRAN (E-UTRAN) and Evolved Packet Core (EPC) network, as standardized by 3GPP.

To help put these techniques in context, FIG. 3 illustrates an overall example architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 3—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, numbered 0 through 19, each with a fixed duration of 0.5 ms. A 1-ms subframe comprises two consecutive slots where subframe i consists of slots 2i and 2i+1.

As briefly mentioned above, a dual connectivity (DC) framework was introduced in LTE Rel-12. In LTE DC, a UE is configured with a Master Cell Group (MCG) associated with a master eNB (MeNB) and a Secondary Cell Group (SCG) associated with a Secondary eNB (SeNB). Each of the CGs includes a primary cell (PCell) and optionally one or more secondary cells (SCells). The term "Special Cell" (or "SpCell" for short) refers to the PCell of the MCG or the PSCell of the SCG depending on whether the UE's medium access control (MAC) entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

Figure 4:
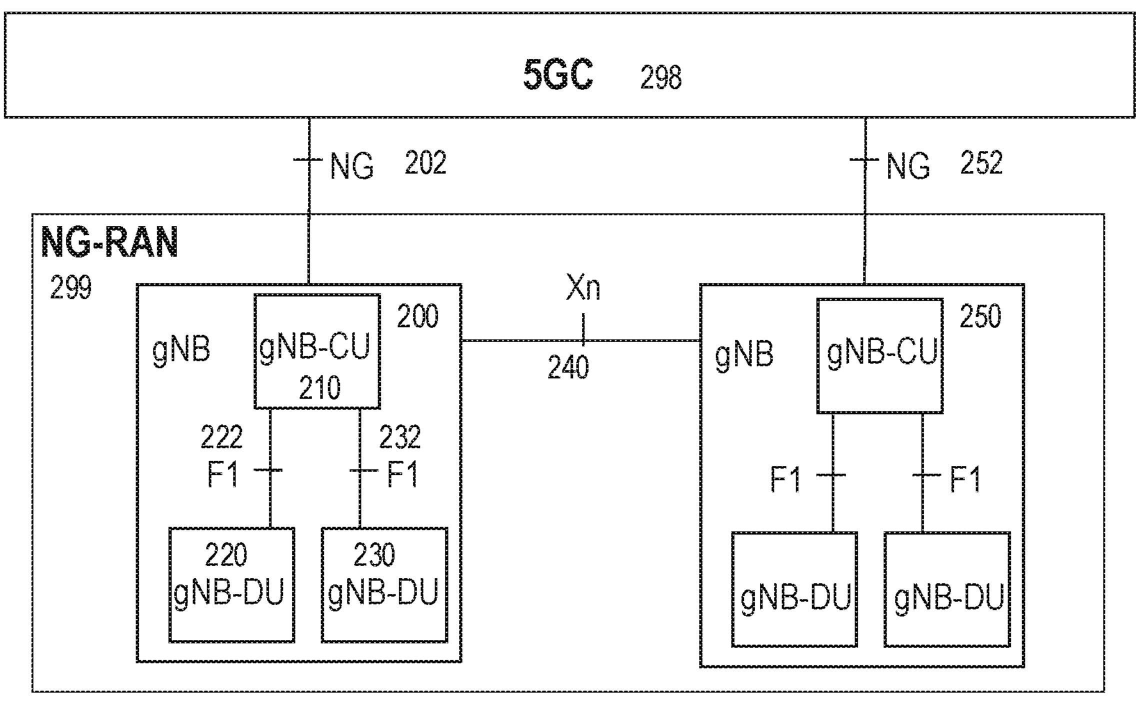
FIG. 4 and FIG. 5 illustrate two high-level views of an example 5G/NR network architecture.

FIG. 4 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 220. With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG- RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some example configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 4 include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. Each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 4. The gNB-CU and connected gNB-DUs are only visible to other gNBs and the 5GC as a gNB. In other words, the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

Figure 5:
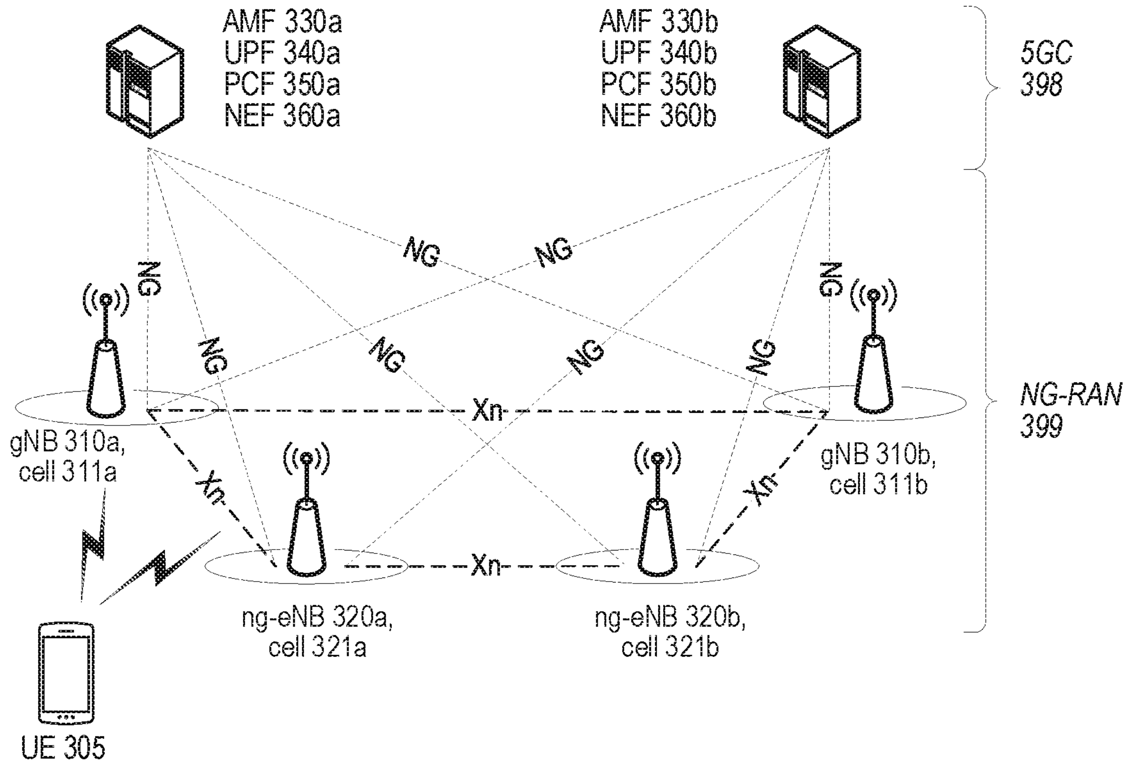

FIG. 5 shows another high-level view of an example 5G network architecture, including a Next Generation Radio Access Network (NG-RAN) 399 and a 5G Core (5GC) 398. As shown in the figure, NG-RAN 399 can include gNBs 310 (e.g., 310*a,b*) and ng-eNBs 320 (e.g., 320*a,b*) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330*a, b*) via respective NG-C interfaces and to the UPF (User Plane Function) 340 (e.g., UPFs 340*a,b*) via respective NG-U interfaces. Moreover, the AMFs 330*a,b* can communicate with one or more policy control functions (PCFs, e.g., PCFs 350*a,b*) and network exposure functions (NEFs, e.g., NEFs 360*a,b*).

Each of the gNBs 310 can support the NR radio interface including frequency division duplexing (FDD), time division duplexing (TDD), or a combination thereof. Each of ng-eNBs 320 can support the LTE radio interface. Unlike conventional LTE eNBs, however, ng-eNBs 320 connect to the 5GC via the NG interface. Each of the gNBs and ng-eNBs can serve a geographic coverage area including one more cells, such as cells 311*a-b* and 321*a-b* shown in FIG. 3. Depending on the particular cell in which it is located, a UE 305 can communicate with the gNB or ng-eNB serving that particular cell via the NR or LTE radio interface, respectively. Although FIG. 3 shows gNBs and ng-eNBs separately, it is also possible that a single NG-RAN node provides both types of functionality.

FIG. 6 shows an example configuration of NR user plane (UP) and control plane (CP) protocol stacks between a UE, a gNB, and an AMF, such as those shown in FIG. 4 and FIG. 5. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. When each IP packet arrives, PDCP starts a discard timer. When this timer expires, PDCP discards the associated SDU and the corresponding PDU. If the PDU was delivered to RLC, PDCP also indicates the discard to RLC.

The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On UP side, the Service Data Adaptation Protocol (SDAP) layer handles quality-of-service (QoS). This includes mapping between QoS flows and Data Radio Bearers (DRBs) and marking QoS flow identifiers (QFI) in UL and DL packets. On CP side, the non-access stratum (NAS) layer is between UE and AMF and handles UE/gNB authentication, mobility management, and security control.

The RRC layer sits below NAS in the UE, but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON, it will be in the RRC_IDLE state until an RRC connection is established with the network, at which time: the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the VIE is camping. However, NR RRC includes an RRC INACTIVE state in which a UE is known (e.g., via UE context) by the serving gNB. RRC INACTIVE has some properties similar to a "suspended" condition used in LTE.

As discussed above, QoE measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE.

QoE measurements may be initiated towards the RAN from an OAM node generically for a group of UEs (e.g., all UEs meeting one or more criteria), or they may also be initiated from the CN to the RAN for a specific UE. The configuration of the measurement includes the measurement details, which is encapsulated in a container that is transparent to RAN.

A "TRACE START" S1AP message is used by the LTE EPC for initiating QoE measurements by a specific UE. This message carries details about the measurement configuration the application should collect in the "Container for application layer measurement configuration" IE, which transparent to the RAN. This message also includes details needed to reach the TCE to which the measurements should be sent.

FIGS. 7A-D show various procedures between a UMTS RAN (UTRAN) and a UE for QoE measurements in a legacy UMTS network. These are similar to those specified for LTE (E-UTRAN). As shown in FIG. 7A, the UTRAN can send a UE Capability Enquiry message to request the UE to report its application layer measurement capabilities. As shown in FIG. 7B, the UE can provide its application layer measurement capabilities to the UTRAN via a UE Capability Information message, particularly in a "Measurement Capability" IE that includes information related to UE capability to perform the QoE measurement collection for streaming services and/or MTSI services. Table 1 below shows example contents of this IE:

TABLE 1

| IE/ Group name | Need | Type and reference | Semantics description | Version |
|---|---|---|---|---|
| QoE Measurement Collection for streaming services | CV-not_iRAT_HoInfo | Enumerated (TRUE) | TRUE means that the UE supports QoE Measurement Collection for streaming services. | REL-14 |
| QoE Measurement Collection for MTSI services | CV-not_iRAT_HoInfo | Enumerated (TRUE) | TRUE means that the UE supports QoE Measurement Collection for MTSI services. | REL-15 |

The UTRAN can respond with a UE Capability Information Confirm message. FIG. 5C shows that the UTRAN can send a Measurement Control message containing "Application layer measurement configuration" IE in order to configure QoE measurement in the UE. Table 2 below shows example contents of this IE:

TABLE 2

| IE/Group name | Need | Type and reference | Version |
|---|---|---|---|
| Container for application layer measurement configuration | MP | Octet string (1 . . . 1000) | REL-14 |
| Service type | MP | Enumerated (QoEStreaming, QoEMTSI) | REL-15 |

FIG. 7D shows that the UE can send QoE measurement results via UTRAN to the TCE using a Measurement Report message that includes an "Application layer measurement reporting" IE. Table 3 below shows example contents of this IE:

TABLE 3

| IE/Group name | Need | Type and reference | Version |
|---|---|---|---|
| Container for application layer measurement reporting | MP | Octet string (1 . . . 8000) | REL-14 |
| Service type | MP | Enumerated (QoEStreaming, QoEMTSI) | REL-15 |

Figure 2:
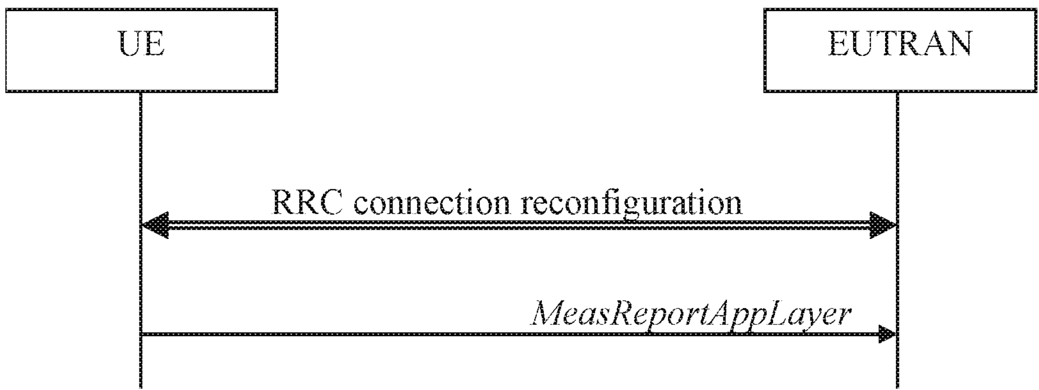
FIG. 2 shows application layer measurement reporting in E-UTRAN.

As was discussed above, FIGS. 1 and 2 illustrate procedures between an E-UTRAN and a UE for configuring QoE measurements in an LTE network. FIG. 1 shows an example UE capability transfer procedure used to transfer UE radio access capability information from the UE to E-UTRAN. Initially, the E-UTRAN can send a UECapabilityEnquiry message, similar to the arrangement shown in FIG. 7A. The UE can respond with a UECapabilityInformation message that includes a "UE-EUTRA-Capability" IE.

This IE may further include a UE-EUTRA-Capability-v1530 IE, which can be used to indicate whether the UE supports QoE Measurement Collection for streaming services and/or MTSI services. In particular, the UE-EUTRA-Capability-v1530 IE can include a measParameters-v1530 IE containing the information about the UE's measurement support. In some cases, the UE-EUTRA-Capability IE can also include a UE-EUTRA-Capability-v16xy-IE", which can include a qoe-Extensions-r16 field. FIG. 8A shows an example ASN.1 data structure for these various IEs, with the various fields defined in Table 4 below.

TABLE 4

| Field name | Description |
|---|---|
| qoe-MeasReport | Indicates whether the UE supports QoE Measurement Collection for streaming services. |
| qoe-MTSI-MeasReport | Indicates whether the UE supports QoE Measurement Collection for MTSI services. |
| 333333qoe-Extensions | Indicates whether the UE supports the Rel-16 extensions for QoE Measurement Collection, i.e., support of more than one QoE measurement type at a time and signaling of withinArea, sessionRecordingIndication, qoe-Reference, temporaryStopQoE and restartQoE |
| temporaryStopQoE | Indicates that reporting, but not collection, of QoE measurements shall be temporarily stopped. |
| withinArea | Indicates at handover, for each application layer measurement, whether the new cell is inside the area for the measurement, i.e., whether the UE is allowed to start new measurements in the cell |
| restartQoE | Indicates that QoE measurements can be reported again after a temporary stop. |

FIG. 8B shows an example ASN.1 data structure for the qoe-Reference parameter mentioned in Table 4 above.

FIGS. 9A-C illustrate various aspects of QoE measurement collection for a UE in an LTE network. In particular, FIG. 9A shows an example signal flow diagram of a QoE measurement collection process for LTE. To initiate QoE measurements, the serving eNB sends to a UE in RRC_CONNECTED state an RRCConnectionReconfiguration message that includes a QoE configuration file, e.g., a measConfigAppLayer IE within an OtherConfig IE. As discussed above, the QoE configuration file is an application-layer measurement configuration received by the eNB (e.g., from EPC) encapsulated in a transparent container, which is forwarded to UE in the RRC message. The UE responds with an RRCConnectionReconfigurationComplete message. Subsequently, the UE performs the configured QoE measurements and sends a MeasReportAppLayer RRC message to the eNB, including a QoE measurement result file. Although not shown, the eNB can forward this result file transparently (e.g., to EPC).

FIG. 9B shows an example ASN.1 data structure for a measConfigAppLayer IE. The setup includes the transparent container measConfigAppLayerContainer which specifies the QoE measurement configuration for the Application of interest. In the service Type field, a value of "qoe" indicates Quality of Experience Measurement Collection for streaming services and a value of "qoemtsi" indicates Enhanced Quality of Experience Measurement Collection for MTSI. This field also includes various spare values.

FIG. 9C shows an example ASN.1 data structure for a measReportAppLayer IE, by which a UE can send to the E-UTRAN (e.g., via SRB4) the QoE measurement results of an application (or service). The service for which the report is being sent is indicated in the service Type IE.

As specified in 3GPP TS 28.405, LTE RAN nodes (i.e., eNBs) are allowed to temporarily stop and restart QoE measurement reporting when an overload situation is observed. This behavior can be summarized as follows. In case of overload in RAN, an eNB may temporarily stop UE reporting by sending to relevant UEs an RRCConnectionReconfiguration message with a measConfigAppLayer IE (in otherConfig) set to temporarily stop application layer measurement reporting. The application stops the reporting and may stop recording further information. When the overload situation in RAN is ended, an eNB may restart UE reporting by sending to relevant UEs an RRCConnectionReconfiguration message with a measConfigAppLayer IE (in otherConfig) set to restart application layer measurement reporting. The application restarts the reporting and recording if it was stopped.

In general, the RAN (e.g., E-UTRAN or NG-RAN) is not aware of an ongoing streaming session for a UE and nor of when QoE measurements are being performed by the UE. Even so, it is important for the client or management function analyzing the measurements that the entire streaming session is measured. It is beneficial, then, that the UE maintains QoE measurements for the entire session, even during handover situation. However, it is an implementation decision when RAN stops the QoE measurements. For example, it could be done when the UE has moved outside the measured area, e.g., due to a handover.

In addition to QoE measurements, a UE can be configured to perform and report measurements to support minimization of drive tests (MDT), which is intended to reduce and/or minimize the requirements for manual testing of actual network performance (i.e., by driving around the geographic coverage of the network). The MDT feature was first studied in LTE Rel-9 (e.g., 3GPP TR 36.805) and first standardized in Rel-10. MDT can address various network performance improvements such as coverage optimization, capacity optimization, mobility optimization, quality-of-service (QoS) verification, and parameterization for common channels (e.g., PDSCH).

A UE can be configured to perform logged and/or immediate MDT measurements. A UE in RRC_IDLE state can be configured (e.g., via a LoggedMeasurementConfiguration RRC message from the network) to perform periodical MDT measurement logging. A received MDT configuration can include logginginterval and loggingduration. The UE starts a timer (T330) set to loggingduration (e.g., 10-120 min) upon receiving the configuration, and perform periodical MDT logging every logginginterval (1.28-61.44 s) within the loggingduration while the UE is in RRC_IDLE state. In particular, the UE collects DL reference signal received strength and quality (i.e., RSRP, RSRQ) based on existing measurements required for cell reselection purposes. The UE reports the collected/logged information to the network when the UE returns to RRC_CONNECTED state. FIG. 4 shows an example logged MDT procedure performed by a UE.

In contrast, a UE can be configured to perform and report immediate MDT measurements while in RRC_CONNECTED state. Similar to logged MDT, immediate MDT measurements are based on existing UE and/or network measurements performed while a UE is in RRC_CONNECTED, and can include any of the following measurement quantities:

M1: RSRP and RSRQ measurement by UE.

M2: Power Headroom measurement by UE.

M3: Received Interference Power measurement by eNB.

M4: Data Volume measurement separately for DL and UL, per QoS class indicator (QCI) per UE, by eNB.

M5: Scheduled IP layer Throughput for MDT measurement separately for DL and UL, per RAB per UE and per UE for the DL, per UE for the UL, by eNB.

M6: Packet Delay measurement, separately for DL and UL, per QCI per UE, see UL PDCP Delay, by the UE, and Packet Delay in the DL per QCI, by the eNB.

M7: Packet Loss rate measurement, separately for DL and UL per QCI per UE, by the eNB.

M8: received signal strength (RSSI) measurement by UE.

M9: round trip time (RTT) measurement by UE.

For example, the reporting of M1 measurements can be event-triggered according to existing RRM configuration for any of events A1-A6 or B1-B2. In addition, M1 reporting can be periodic, A2 event-triggered, or A2 event-triggered periodic according to an MDT-specific measurement configuration. As another example, the reporting of M2 measurements can be based on reception of Power Headroom Report (PHR), while reporting for M3-M9 can be triggered by the expiration of a measurement collection period.

As discussed above, the existing solution for QoE measurements in LTE networks is designed to collect an extensive set of measurements for different services which can result in a large amount of measurement data to be reported to the requesting entity, e.g., CN or OAM. It has been agreed for 3GPP Rel-17 to provide RAN nodes visibility into QoE reports so that RAN nodes can adapt various aspects of their performance based on UE QoE measurements. This can be particularly beneficial for URLLC services, since QoE reporting is likely to be fast and frequent such that a RAN node can quickly adapt performance to meet URLLC service requirements.

As further noted above, however, reconfiguration of a UE's connections after a first RAN has configured the UE for QoE measurements may result in a second RAN unknowingly tampering with ongoing measurements. Detailed below are solutions for enabling a coordinated handling, between RAN nodes, of QoE measurements and associated radio related measurement (such as MDT measurements) configured for a UE, where the handling pertains to the following connectivity procedures pertaining to this UE: Dual Connectivity, mobility, RRC resume and RRC reestablishment.

These solutions may be first described by detailing techniques related to the first RAN node, i.e., the node, in the several scenarios briefly described above, that configures the UE with QoE measurements. According to various scenarios, this first RAN node is associated with a second RAN node due to operations or signaling procedures involving both the first RAN node and the second RAN node, such as, for example, dual connectivity, mobility, RRC resume, RRC reestablishment, switching the transfer of the data for the service from a path going to the UE via the first RAN node to a path going to the UE via the second RAN node (non-limiting examples). The first RAN node has sent a RRC message to configure the wireless terminal for QoE measurements.

Figure 10:
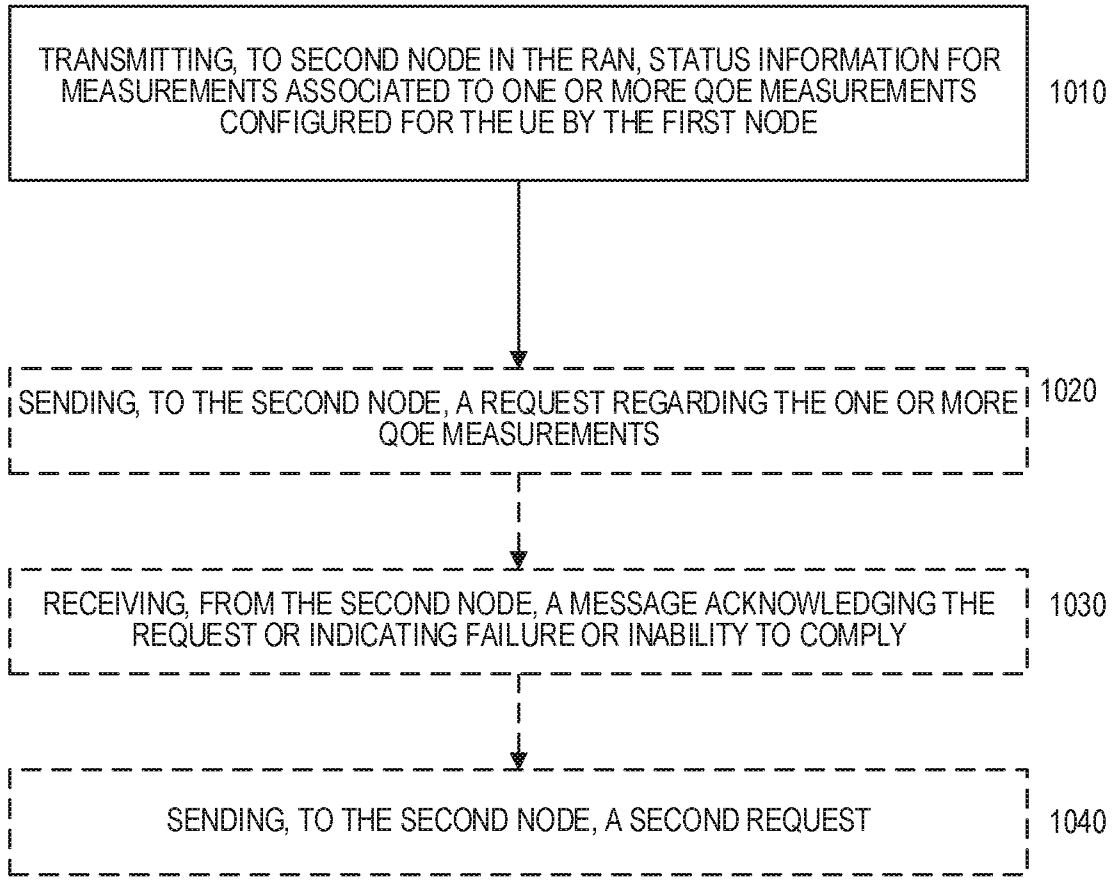
FIG. 10 is a flow diagram of an example method (e.g., procedure) for a first RAN node (RNN, e.g., eNB, gNB, ng-eNB, etc. or component(s) thereof), according to various example embodiments of the present disclosure.

FIG. 10 is a process flow illustrating an example method according to the techniques detailed immediately and as described generally herein, for a first RAN node.

In a first approach according to various of the presently disclosed techniques, the first RAN node transmits, to the second RAN node, status information concerning the measurements associated to one (or a list of) QoE measurements with which the first RAN node configured a wireless terminal for QoE measurements. This is shown at block 1010 of FIG. 10. This status information of the QoE measurements may comprise some or all of the following:

- information concerning the configured QoE measurements
  - an identifier of the UE, or a list of UE identifiers for the group of UEs, which is/are configured for QoE measurements
  - one or a list of QoE measurement(s) or QoE measurement configuration(s) configured for a wireless terminal or a group of wireless terminals
  - a reference, or a list of references, such as one or a list of QoE reference ID(s) associated to the configured QoE measurements
  - an indication concerning the type of the configured QoE measurements, such as management-based QoE or signaling-based QoE (e.g. as part of dual connectivity scenario)
  - an indication or a list of indications indicating the service types or service subtypes to which the QoE measurements pertain to
  - an indication of whether a session of an application belonging to a service type or service subtype a QoE measurement configuration targets is ongoing, or a list of such indications
  - an indication indicating that a session of an application belonging to a service type or service subtype a QoE measurement configuration targets has started, or a list of such indications
  - an indication indicating that a session of an application belonging to a service type or service subtype a QoE measurement configuration targets has stopped, or a list of such indications
  - per-service type of per-service subtype indication(s) or a per-service type or per-service subtype list of indications indicating if the respective QoE measurements are configured (i.e the measurements have been configured but not yet started), activated (i.e. the application session has started and the measurements are currently ongoing), suspended, deactivated, non-activated
  - an indication that per-slice QoE measurements has been enabled and a list of corresponding S-NSSAIs
  - an indication of the RAT type(s) for which the QoE measurements are valid
  - an indication or a list of indications concerning the MCEs associated to the configured QoE measurements
  - an indication that the second RAN node shall consider the configured QoE measurements as valid for a certain period of time or until a given time of the day, or a time remaining for the QoE measurement collection process, or the overall time from QoE measurement collection start to QoE measurement collection termination
  - an indication of an area scope or a list of area scopes within which the configured QoE measurement configuration(s) is(are) valid
  - a reference, or a list of references to ongoing radio related measurement (e.g., MDT measurements) coupled to the ongoing QoE measurements
- information concerning the QoE measurements reporting configuration
  - The size of the QoE measurement report to be signalled to the TCE
  - The period with which the QoE measurement report should be signalled to the TCE
  - An indication, signalled together with a QoE report, stating whether the QoE report has been already signalled to the TCE.
- information concerning radio related measurement (e.g., MDT measurements) coupled to the configured QoE measurements, such as:
  - the configuration of radio related measurements coupled to the ongoing QoE measurements
  - a reference, or a list of references to ongoing radio related measurements coupled to the ongoing QoE measurements
  - a reference, or a list of references, of the QoE measurements coupled to the radio related measurements
- In case a group of UEs is simultaneously undergoing one of the above described signaling procedures of interest (such as dual connectivity, mobility, RRC resume, RRC reestablishment), the actions described herein and the corresponding measurement status transfer signaling may carry the statuses pertaining to more than one UE (for example, a list of measurements configured for all UEs currently undergoing a handover). Note that signalling procedures for mobility, RRC resume, and RRC reestablishment, for example, are typically executed for one UE at a time, so the status information transfer described above for a group of UEs may be carried in a newly defined procedure.

In a second technique according to various of the presently disclosed embodiments, the first RAN node sends, to the second RAN node, requests concerning the QoE measurements associated to one (or a list of) QoE measurement configuration(s) that the first RAN node previously sent to the wireless terminal for QoE measurements or requests concerning radio-related measurements (such as MDT)

associated to the above QoE measurements. An example is shown at block 1020 of FIG. 10. These requests may comprise:

- requests concerning the configured QoE measurements, e.g.:
  - a request to suspend one or a list of the activated QoE measurements
  - a request to resume one or a list of the suspended QoE measurements
  - a request to release or to pause one or a list of the activated QoE measurements
    - in a first example related to Inter-RAT mobility or inter-system mobility, the second RAN node belongs to a RAT or a system that does not support one or more of the service types or service subtypes associated to the ongoing QoE measurements, meaning that the measurements pertaining to these service types and/or subtypes are hence to be released or paused.
    - another example is when a procedure (e.g., associated to dual connectivity operation) is about to be triggered and the first RAN node that configured the UE for QoE measurements received an indication (e.g. from OAM) that the full set or part of the ongoing QoE measurements shall be stopped or paused.
  - a request to reconfigure, e.g., replace, a QoE measurement configuration, or a list of such reconfigurations/replacements
  - a request to send to the first RAN node (or to buffer and subsequently send to the first RAN node) the QoE reports received by the second RAN node, the request optionally comprising additional conditions associated to the start and the stop of such reporting, such as:
    - a reconfiguration of the (signaling) radio bearers at the UE which results in the switch of RAN node receiving the QoE reports, an overload indication sent from the first RAN node to the second RAN node, a period of time, until session end, until a subsequent mobility events is triggered, until further UE reconfiguration, service type or service subtype, slice or list of slices
- request concerning radio measurements (e.g. MDT measurements) coupled to the configured QoE measurements, e.g.:
  - a request to configure the wireless terminal with the same configuration used by the first RAN node to configure the wireless terminal for radio measurements
    - subset of the configuration used by the first RAN node can be requested by the first RAN node (or accepted by the second RAN node). This may be wanted (or necessary) e.g. (1) if the QoE measurement configuration is modified so that part of the previously configured radio measurements are no longer required; (2) the second RAN node supports only part of the radio measurement configuration that the first RAN node configured for the wireless terminal.
  - a request to trigger previously configured measurements, release, pause ongoing measurements, suspend a QoE configuration or resume radio related measurements (such as MDT measurements)
- In an alternative solution, the first RAN node first sends a request message and the second RAN node may respond with an acknowledge, or with a failure and, e.g. the second RAN node indicating that it is capable of fulfilling the request or indicating that it is capable to fulfil part of the request. This response is shown at block 1030 of FIG. 10. The first RAN node may then send a second, modified, request message based on the reply from the second RAN node, as shown at block 1040 of FIG. 10.
- In case the operations pertaining to the second embodiment need to be executed for a group of UEs, the requests pertaining to multiple UEs described may be carried in the same message (for example a list of measurements configured for all UEs currently undergoing a handover). Note that signalling procedures for, e.g., mobility, RRC resume, RRC reestablishment are typically executed for one UE at a time, so the request described above for a group of UEs may be carried in a newly defined procedure.
  - In a sub-embodiment the request message includes the UE identifiers for one or a list of UE(s) that the QoE measurement related request is sent targeting those UEs. The UE identifier can be any variant of NG-RAN node UE XnAP ID. Some non-limiting examples are: M-NG-RAN node UE XnAP ID or S-NG-RAN node UE XnAP ID.
  - In other sub-embodiments, the requests pertaining to multiple UEs may be of the same type for all UEs (in which case a single request type indication is needed for the whole list of UEs) or may be of different types for different UEs (wherein this includes that in a list of diverse request types for a group of multiple UEs, there may still be UEs for which the same request types are indicated).
- In all of the above, more than one type of request pertaining to the same UE or the same QoE measurement configuration may be conveyed in the same message (i.e. multiple requests per UE or QoE measurement configuration may be included in the same message from the first RAN node to the second RAN node).

Figure 11:
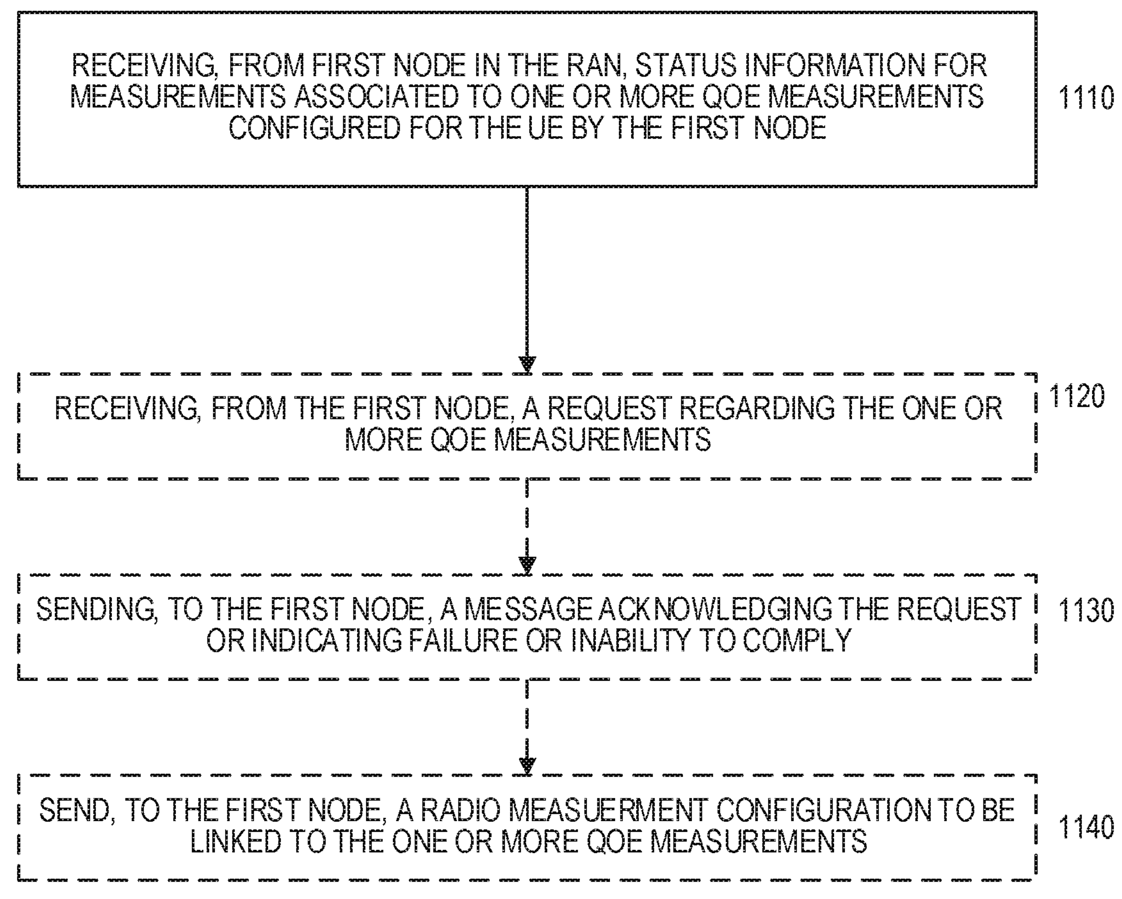
FIG. 11 is a flow diagram of an example method (e.g., procedure) for a second RAN node (RNN, e.g., eNB, gNB, ng-eNB, etc. or component(s) thereof), according to various example embodiments of the present disclosure.

Other aspects of the presently disclosed techniques may be described with respect to the second RAN node discussed in the various scenarios mentioned above, i.e., the node that receives certain information from the first RAN node regarding a previous QoE measurement configuration for a UE. This second RAN node is associated with the first RAN node due to operations or signaling procedures involving both the first RAN node and the second RAN node, such as dual connectivity, mobility, resume, reestablishment, etc. FIG. 11 is a process flow diagram illustrating an example method according to these techniques, for the second RAN node In some embodiments, the second RAN node receives, from the first RAN node, status information concerning the QoE measurements associated to one (or a list of) QoE measurement configuration(s) with which the first RAN node configured a wireless terminal for QoE measurements. This is shown at block 1110 of FIG. 11. This status information of the QoE measurements may comprise the information detailed in the embodiments for the first RAN node, above.

In some of these and in other embodiments, the second RAN node receives, from the first RAN node, requests concerning the QoE measurements associated to one (or a list of) QoE measurement configuration(s) with which the first RAN node sent an RRC message with QoE configuration to the UE for QoE measurements. An example is shown at block 1120 of FIG. 11. These requests may comprise any of the requests detailed in the embodiments for the first RAN node, above.

In response to a request of one of the previously indicated types from the first RAN node, the second RAN node may send an indication of the status of the execution of the request, e.g., wherein such a status indication may indicate one of "successful", "rejected", "pending", "partially successful—partially rejected", or "partially pending—partially rejected," for example (where other execution status indications are not precluded).

In the above, if more than one UE simultaneously undergoes the procedures triggering the above actions (status information sending or request sending) the corresponding network signaling may carry, in the same message, status indications and/or requests pertaining to one or more of these UEs.

If the second RAN node receives from the first RAN node a message with requests (of one or more of the previously described type(s) of request(s)), the second RAN node may respond with indications of the status of the execution of the first RAN node's requests. An example is shown at block 1130 of FIG. 11. The indications may be per UE or per QoE measurement configuration and each indication may, e.g., be one of "successful", "rejected", "pending", "partially successful—partially rejected", or "partially pending—partially rejected" (where other execution status indications are not precluded).

In some embodiments, upon receiving from the first RAN node a QoE measurement configuration associated with a UE, or an indication of a QoE measurement configuration associated with a UE (where the UE is served by the second RAN node or will be served by the second RAN node after on ongoing or in the process of being prepared mobility or dual/multi-connectivity operation has been concluded), or at any later time while the UE is served by the second RAN node and the concerned QoE measurement configuration is still existing and valid, the second RAN node may send an MDT or RRM measurement configuration to the first RAN node to be forwarded to the UE, wherein this MDT or RRM measurement configuration optionally may be linked to the QoE measurement configuration, e.g., to enable synchronization and/or coordination of the QoE measurements and the MDT and/or RRM measurements. An example of this is shown at block 1140 of FIG. 11.

In other embodiments, upon receiving from the first RAN node a QoE measurement configuration associated with a UE, or an indication of a QoE measurement configuration associated with a UE (where the UE is served by the second RAN node or will be served by the second RAN node after on ongoing or in the process of being prepared mobility or dual/multi-connectivity operation has been concluded), or at any later time while the UE is served by the second RAN node and the concerned QoE measurement configuration is still existing and valid, the second RAN node may send to the first RAN node a request to configure the UE with MDT or RRM measurements to be linked to the concerned QoE measurement configuration, e.g., to enable synchronization and/or coordination of the QoE measurements and the MDT and/or RRM measurements.

In yet other embodiments, upon receiving from the first RAN node a QoE measurement configuration associated with a UE, or an indication of a QoE measurement configuration associated with a UE (where the UE is served by the second RAN node or will be served by the second RAN node after on ongoing or in the process of being prepared mobility or dual/multi-connectivity operation has been concluded), or at any later time while the UE is served by the second RAN node and the concerned QoE measurement configuration is still existing and valid, the second RAN node may send an MDT or RRM measurement configuration to the UE, wherein this MDT or RRM measurement configuration optionally may be linked to the QoE measurement configuration, e.g. to enable synchronization and/or coordination of the QoE measurements and the MDT and/or RRM measurements.

In one embodiment, if the second RAN receives a set of information from the first RAN concerning the QoE measurements status, the second RAN may use them to manage possible new QoE measurements configurations received:

If the second RAN receives a new signalling-based configuration and if the second RAN is operating on a RAT different from the first RAN, the second RAN will configure the UE with the new signaling based configuration either directly or via the first RAN node.

If the second RAN receives a new signalling-based configuration and if the second RAN is serving the UE on the same RAT as the first RAT, the second RAN will compare the newly received QoE measurement configuration with the information received from the first RAN node. If the new configuration is included in the current ongoing configuration, the second RAN may decide not to configure the UE with such configuration. IF the new configuration includes parts of the configuration ongoing at first RAN, the second RAN may decide to configure the UE with a configuration that merges the configurations at first and second RAN nodes. Alternatively, the second RAN may decide to configure the UE with the newly received configuration and overwrite the configuration in place.

If the second RAN receives a new signalling-based configuration and if the second RAN is serving the UE on the same RAT as the first RAT, the second RAT may decide to signal to the first RAN the new signaling-based configuration so that the first RAN can accept the new configuration and signal it to the UE, or merge the new configuration with the old one and signal it to the UE or reject the new configuration and keep the UE on the existing configuration (case of configuration via first RAN)

The process above may be repeated for management based QoE configurations

In another embodiment if the second RAN node receives an indication of whether the QoE report has been signalled to the TCE, together with QoE measurement configurations including report size and/or frequency of reporting to the TCE, the second RAN node should Check whether the QoE report received from the first RAN node has been signalled to the TCE, and if not Continue to add to the QoE report new QoE measurement results until the report reaches the report size configured as part of the QoE measurement configuration and/or Continue to add to the QoE report new QoE measurement results until the QoE reporting period (derived from the frequency at which the second RAN node should report QoE reports to the TCE) expires, after which the RAN should signal the report to the TCE In case both a QoE report size and a reporting frequency for QoE Reports is configured as part of the QoE measurement configuration, the second RAN node should signal the QoE Report to the TCE when the first of these two conditions (report size or report period expiration) is fulfilled. As a further option, the RAN node may signal the QoE report to the TCE if the UE leaves the current serving cell(s), at least if it thereby also leaves an area scope configured for the QoE configuration.

The techniques described herein may also be described with respect to the UE in the various scenarios discussed above. To resolve a situation that a UE RRC receives two QoE configurations from two different legs, a UE RRC can take some actions, even without network involvement (i.e., without signaling of the QoE configuration status between first and second RAN nodes).

Figure 12:
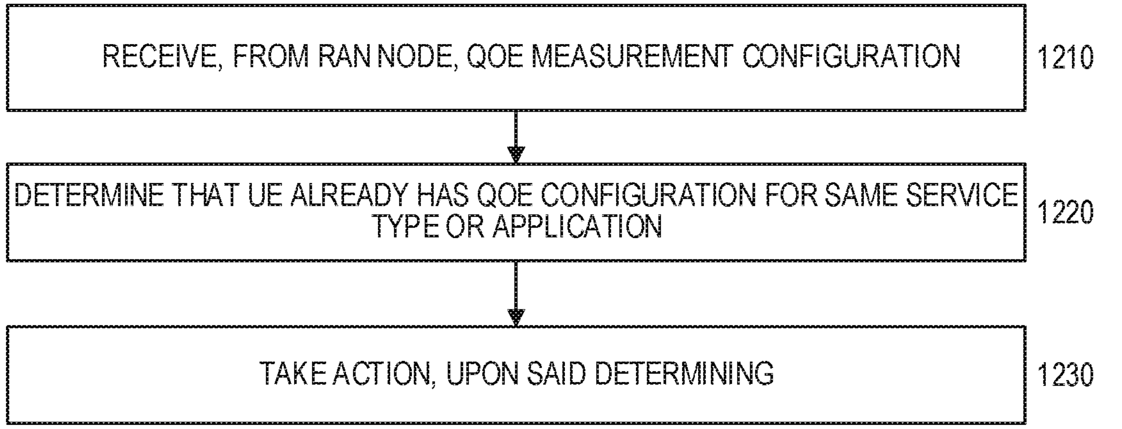
FIG. 12 is a flow diagram of an example method (e.g., procedure) for a user equipment (UE, e.g., wireless device, IoT device, etc. or component(s) thereof), according to various example embodiments of the present disclosure.

FIG. 12 shows an example approach. As shown at block 1210, the UE receives, from a RAN node, a QoE measurement configuration for one or more service types. Upon receiving this QoE measurement configuration for a service type or application, the UE may check whether the RRC and upper layers are already configured with an existing QoE configuration for the same service type or the same application, as shown at block 1220. As shown at block 1230, if there exists a QoE configuration of the same service type, UE RRC may take one of the following actions:

- Discard the new configuration or
- Release the old configuration and configure itself and the upper layers with the new configuration
- Suspend the new configuration or
- Suspend the old configuration and activate the new configuration
- If the old configuration is already in a suspended state when the new configuration is received, keep the new configuration active and either release the old configuration or keep the old configuration suspended
- If the type of the services/applications or a subtype of services is specified by the new QoE configuration, configure itself and the upper layers of the targeted type or subtype of the services and/or targeted applications with the mentioned services and keep the old configuration for the rest of the applications.
- In a dual connectivity scenario, if one of the QoE configurations was received from a master node while the other was received from a secondary node, release the QoE configuration received from the secondary node and keep the QoE configuration received from the master node.
- In a dual connectivity scenario, if one of the QoE configurations was received from a master node while the other was received from a secondary node, suspend the QoE configuration received from the secondary node and keep the QoE configuration received from the master node active.
- If an ongoing application session of the type of service and/or subtype of service that the QoE configurations target (or all such ongoing applications sessions in case more than one is ongoing) is currently using radio bearer(s) towards the RAN node from which the old configuration was received, keep the old configuration and either release or suspend the new configuration.
- If an ongoing application session of the type of service and/or subtype of service that the QoE configurations target (or all such ongoing applications sessions in case more than one is ongoing) is currently using radio bearer(s) towards the RAN node from which the new configuration was received, keep the new configuration and either release or suspend the old configuration Examples of implementation of the above-described techniques according to the specifications for NG-RAN are now described. These examples are provided in relation to Dual Connectivity operation, Mobility, Resume and Reestablishments Non-limiting examples of X2AP procedures and related messages that can be impacted for Dual Connectivity:

- SgNB Addition Preparation, SGNB ADDITION REQUEST
- SgNB initiated SgNB Release, SGNB RELEASE REQUIRED
- MeNB initiated SgNB Release, SGNB RELEASE REQUEST
- SgNB Cell Change, SGB CHANGE REQUIRED
- SeNB Addition Preparation, SENB ADDITION REQUEST
- SeNB initiated SeNB Release, SENB RELEASE REQUIRED
- MeNB initiated SeNB Release, SENB RELEASE REQUEST
- Trace Start, TRACE START Non-limiting examples of XnAP procedures and related messages that can be impacted for Dual Connectivity:

- S-NG-RAN node Addition Preparation, S-NODE ADDITION REQUEST
- S-NG-RAN node initiated S-NG-RAN node Change, S-NODE CHANGE REQUIRED
- M-NG-RAN node initiated S-NG-RAN node Release, S-NODE RELEASE REQUEST
- S-NG-RAN node initiated S-NG-RAN node Release, S-NODE RELEASE REQUIRED
- Trace Start, TRACE START Non-limiting examples of X2AP procedures and related messages that can be impacted for Mobility:

- Handover Preparation, HANDOVER REQUEST
- Handover Cancel, HANDOVER CANCEL
- Handover Success, HANDOVER SUCCESS
- Conditional Handover Cancel, CONDITIONAL HANDOVER CANCEL
- Handover Report, HANDOVER REPORT Non-limiting examples of XnAP procedures and related messages that can be impacted for Mobility:

- Handover Preparation, HANDOVER REQUEST
- Handover Cancel, HANDOVER CANCEL
- Handover Success, HANDOVER SUCCESS
- Access and Mobility Indication, ACCESS AND MOBILITY INDICATION Non-limiting examples of X2AP procedures and related messages that can be impacted for Resume and Reestablishment:

- Retrieve UE Context, RETRIEVE UE CONTEXT RESPONSE

Non-limiting examples of XnAP procedures and related messages that can be impacted for Resume and Reestablishment:

- Retrieve UE Context, RETRIEVE UE CONTEXT RESPONSE

Non-limiting examples of NGAP procedures and related messages that can be impacted for mobility

- Handover Preparation, HANDOVER REQUIRED, HANDOVER COMMAND
- Handover Resource Allocation, HANDOVER REQUEST, HANDOVER REQUEST ACKNOWLEDGE
- Handover Success, HANDOVER SUCCESS
- Handover Cancel, HANDOVER CANCEL As a non-limiting example of implementation, an IE "UE Application layer measurement configuration," which includes QMC related configuration parameters, is extended to include options according to the present invention. The "UE Application layer measurement configuration" is added to various XnAP, X2AP, NGAP, S1AP messages. An example is provided below for S-NODE ADDITION REQUEST, which can apply to NR-DC scenario:

----------------------------begin proposed 3GPP specification-----------------------------

9.1.2.1 S-Node Addition Request

This message is sent by the M-NG-RAN node to the S-NG-RAN node to request the preparation of resources for dual connectivity operation for a specific UE.

Direction: M-NG-RAN Node® S-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| UE Security Capabilities | M | | 9.2.3.49 | | YES | reject |
| S-NG-RAN node Security Key | M | | 9.2.3.51 | | YES | reject |
| S-NG-RAN node UE Aggregate Maximum Bit Rate | M | | UE Aggregate Maximum Bit Rate 9.2.3.17 | The UE Aggregate Maximum Bit Rate is split into M-NG-RAN node UE Aggregate Maximum Bit Rate and S-NG-RAN node UE Aggregate Maximum Bit Rate which are enforced by M-NG-RAN node and S-NG-RAN node respectively. | YES | reject |
| Selected PLMN | O | | PLMN Identity 9.2.2.4 | The selected PLMN of the SCG in the S-NG-RAN node. | YES | ignore |
| Mobility Restriction List | O | | 9.2.3.53 | | YES | ignore |
| Index to RAT/Frequency Selection Priority | O | | 9.2.3.23 | | YES | reject |
| PDU Session Resources To Be Added List | | 1 | | | YES | reject |
| >PDU Session Resources To Be Added Item | | 1 . . . <maxnoofPDUSessions> | | NOTE: If neither the PDU Session Resource Setup Info - SN terminated IE nor the PDU Session Resource Setup Info - MN terminated IE is present in a PDU Session Resources To Be Added Item IE, abnormal conditions as specified in clause 8.3.1.4 apply. | — | |
| >>PDU Session ID | M | | 9.2.3.18 | | — | |
| >>S-NSSAI | M | | 9.2.3.21 | | — | |
| >>S-NG-RAN node PDU Session Aggregate Maximum Bit Rate | O | | PDU Session Aggregate Maximum Bit Rate 9.2.3.69 | | — | |
| >>PDU Session Resource Setup Info - SN terminated | O | | 9.2.1.5 | | — | |
| >>PDU Session Resource Setup Info - MN terminated | O | | 9.2.1.7 | | — | |

-continued

| IE/Group Name | Presence | Range | IE type and reference | Semantics description | Criticality | Assigned Criticality |
|---|---|---|---|---|---|---|
| M-NG-RAN node to S-NG-RAN node Container | M | | OCTET STRING | Includes the CG-ConfigInfo message as defined in subclause 11.2.2 of TS 38.331 [10] | YES | reject |
| S-NG-RAN node UE XnAP ID | O | | NG-RAN node UE XnAP ID 9.2.3.16 | Allocated at the S-NG-RAN node | YES | reject |
| Expected UE Behaviour | O | | 9.2.3.81 | | YES | ignore |
| Requested Split SRBs | O | | ENUMERATED (srb1, srb2, srb1&2, . . .) | Indicates that resources for Split SRBs are requested. | YES | reject |
| PCell ID | O | | Global NG-RAN Cell Identity 9.2.2.27 | | YES | reject |
| Desired Activity Notification Level | O | | 9.2.3.77 | | YES | ignore |
| Available DRB IDs | C-ifSNterminated | | DRB List 9.2.1.29 | Indicates the list of DRB IDs that the S-NG-RAN node may use for SN-terminated bearers. | YES | reject |
| S-NG-RAN node Maximum Integrity Protected Data Rate Uplink | O | | Bit Rate 9.2.3.4 | The S-NG-RAN node Maximum Integrity Protected Data Rate Uplink is a portion of the UE's Maximum Integrity Protected Data Rate in the Uplink, which is enforced by the S-NG-RAN node for the UE's SN terminated PDU sessions. If the S-NG-RAN node Maximum Integrity Protected Data Rate Downlink IE is not present, this IE applies to both UL and DL. | YES | reject |
| S-NG-RAN node Maximum Integrity Protected Data Rate Downlink | O | | Bit Rate 9.2.3.4 | The S-NG-RAN node Maximum Integrity Protected Data Rate Downlink is a portion of the UE's Maximum Integrity Protected Data Rate in the Downlink, which is enforced by the S-NG-RAN node for the UE's SN terminated PDU sessions. | YES | reject |
| Location Information at S-NODE reporting | O | | ENUMERATED (pscell, . . .) | Indicates that the user's Location Information at S-NODE is to be provided. | YES | ignore |
| MR-DC Resource Coordination Information | O | | 9.2.2.33 | Information used to coordinate resource utilisation between M-NG-RAN node and S-NG-RAN node. | YES | ignore |

-continued

| IE/Group Name | Presence | Range | IE type and reference | Semantics description | Criticality | Assigned Criticality |
|---|---|---|---|---|---|---|
| Masked IMEISV | O | | 9.2.3.32 | | YES | ignore |
| NE-DC TDM Pattern | O | | 9.2.2.38 | | YES | ignore |
| SN Addition Trigger Indication | O | | ENUMERATED (SN change, inter-MN HO, intra-MN HO, . . .) | This IE indicates the trigger for S-NG-RAN node Addition Preparation procedure | YES | reject |
| Trace Activation | O | | 9.2.3.55 | | YES | ignore |
| Requested Fast MCG recovery via SRB3 | O | | ENUMERATED (true, . . .) | Indicates that the resources for fast MCG recovery via SRB3 are requested. | YES | ignore |
| UE Radio Capability ID | O | | 9.2.3.138 | | YES | Reject |
| UE Application layer measurement configuration | | | 9.2.3.X | | | |

| Range bound | Explanation |
|---|---|
| maxnoofPDUSessions | Maximum no. of PDU sessions. Value is 256 |

| Condition | Explanation |
|---|---|
| ifSNterminated | This IE shall be present if there is at least one PDU Session Resource Setup Info-SN terminated in the PDU Session Resources To Be Added List IE. |

9.2.3.X UE Application Layer Measurement Configuration

The IE defines configuration information for the QoE Measurement Collection (QMC) function.

| IE/ Group Name | Presence | Range | IE type and reference | Semantics description |
|---|---|---|---|---|
| Container for application layer measurement configuration | O | | Octet string (1 . . . 1000) | Indicates application layer measurement configuration, see Annex L in [36]. |
| CHOICE Area Scope of QMC | M | | | |
| >Cell based | | | | |
| >>Cell ID List for QMC | | 1 . . . <maxnoofCellIDforQMC> | | |
| >>>E-CGI | M | | 9.2.1.38 | |
| >TA based | | | | |
| >>TA List for QMC | | 1 . . . <maxnoofTAforQMC> | | |
| >>>TAC | M | | 9.2.3.7 | The TAI is derived using the current serving PLMN. |
| >TAI based | | | | |
| >>TAI List for QMC | | 1 . . . <maxnoofTAforQMC> | | |

-continued

| IE/ Group Name | Presence | Range | IE type and reference | Semantics description |
|---|---|---|---|---|
| >>>TAI | M | | 9.2.3.16 | |
| >PLMN area based | | | | |
| >>PLMN List for QMC | | 1 . . . <maxnoofPLMNforQMC> | | |
| >>>PLMN Identity | M | | 9.2.3.8 | |
| Service Type | M | | ENUMERATED (QMC for streaming service, QMC for MTSI service, . . . ) | This IE indicates the service type of UE application layer measurements. |
| QMC status info list | | 0 . . . <maxnoofQMC> | | |
| > QMC status info item | | | | |
| >> QMC reference ID | M | | | |
| >> QMC type | M | | ENUMERATED {management based, signaling based, . . . } | |
| >> QMC validity info | O | | | |
| >>> QMC status | M | | ENUMERATED {activated, suspended, to-be-resumed, to-be-stopped, not activated . . . } | This IE indicates the desired status of QMC |
| >>> Time-to-live | O | | INTEGER (0,1 . . . 100000) | Time to live for the QMC after in minutes. |
| >>> S-NSSAI list | O | 0 . . . <maxnoofSNSSAI> | | |
| >>>> S-NSSAI | | 9.2.3.21 (XnAP) | | |
| >> Coupled MDT meas info | O | | | |
| >>> MDT reference ID | M | | | |
| >>> MDT Configuration | M | | 9.2.3.125 (XnAP) | This IE defines the MDT configuration parameters. |

| Range bound | Explanation |
|---|---|
| maxnoofQMC | Maximum no. of QMC collections. Value is 16. |
| maxnoofSNSSAI | Maximum no. of signalled slice support items. Value is 1024. |

----------------------------end proposed 3GPP specification----------------------------

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
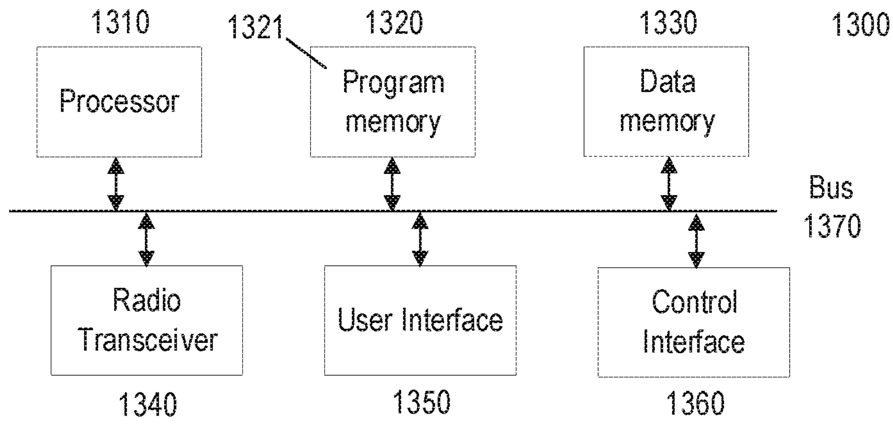
FIG. 13 is a block diagram of an example wireless device or UE according to various example embodiments of the present disclosure.

FIG. 13 shows a block diagram of an example wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the example methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13)

that, when executed by processor 1310, can configure and/or facilitate UE 1300 to perform various operations, including operations corresponding to various example methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the example methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the example methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some example embodiments, the radio transceiver 1340 includes one or more transmitters and one or more receivers that enable UE 1300 to communicate according to various protocols and/or methods proposed for standardization by 3GPP and/or other standards-setting organizations (SSOs). For example, such functionality can operate cooperatively with processor 1310 to implement a PHY layer based on OFDM, OFDMA, and/or SC-FDMA technologies, such as described herein with respect to other figures.

In some example embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some example embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible devices. In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many example embodiments of the UE 1300 having a touch screen display are capable of receiving user inputs, such as inputs related to example methods described herein or otherwise known to persons of ordinary skill.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this example manner, the application program can maintain the screen display in a manner that is readable by the user, regardless of the physical orientation of the device. In addition, the output of the orientation sensor can be used in conjunction with various example embodiments of the present disclosure.

A control interface 1360 of the UE 1300 can take various forms depending on the particular example embodiment of UE 1300 and of the particular interface requirements of other devices that the UE 1300 is intended to communicate with and/or control. For example, the control interface 1360 can comprise an RS-232 interface, a USB interface, an HDMI interface, a Bluetooth interface, an IEEE ("Firewire") interface, an $I^2C$ interface, a PCMCIA interface, or the like. In some example embodiments of the present disclosure, control interface 1360 can comprise an IEEE 802.3 Ethernet interface such as described above. In some example embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any example embodiments (e.g., of methods) described herein.

Figure 14:
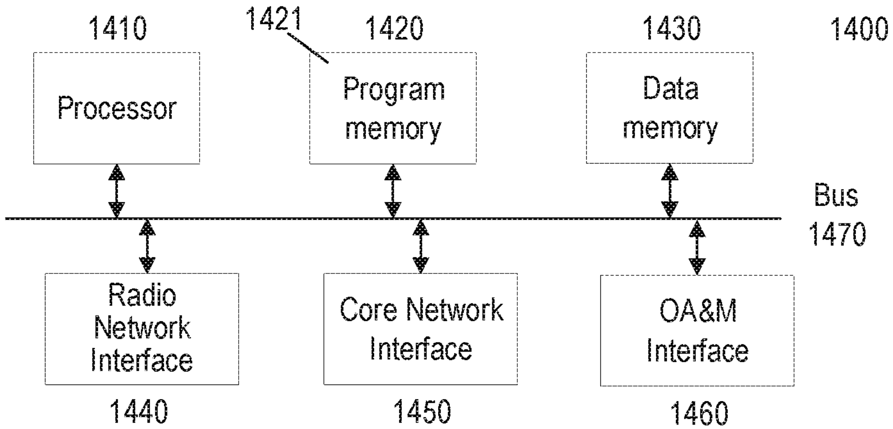
FIG. 14 is a block diagram of an example network node according to various example embodiments of the present disclosure.

FIG. 14 shows a block diagram of an example network node 1400 according to various embodiments of the present disclosure, including those described above with reference to other figures. For example, example network node 1400 can be configured by execution of instructions, stored on a computer-readable medium, to perform operations corresponding to one or more of the example methods described herein. In some example embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various example methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. Program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some example embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further example embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1-interface standardized by 3GPP. In some embodiments, core network interface 1450 can comprise the NG interface standardized by 3GPP. In some example embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN (also referred to as a "wireless network"), such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
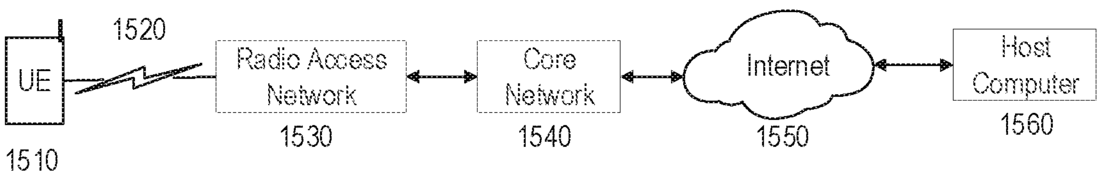
FIG. 15 is a block diagram of an example network configured to provide over-the-top (OTT) data services between a host computer and a UE, according to various example embodiments of the present disclosure.

FIG. 15 is a block diagram of an example communication network configured to provide over-the-top (OTT) data services between a host computer and a user equipment (UE), according to various example embodiments of the present disclosure. UE 1510 can communicate with radio access network (RAN, also referred to as "wireless network") 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some example embodiments, RAN 1530 and core network 1540 can be configured and/or arranged as shown in other figures discussed above. For example, eNBs comprising an E-UTRAN 1530 can communicate with an EPC core network 1540 via an S1 interface. As another example, gNBs and ng-eNBs comprising an NG-RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as example host computer 1560. In some example embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the example configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The example network shown in FIG. 15 can also include measurement procedures and/or sensors that monitor network performance metrics including data rate, latency and other factors that are improved by example embodiments disclosed herein. The example network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The embodiments described herein provide novel techniques for configuring, performing, and reporting lightweight QoE metrics by UEs. Such techniques can facilitate better analysis and optimization decisions in the RAN, while avoiding unnecessary network traffic caused by conventional measurement reports that include large amounts of information, such as conventional QoE metrics. When used in NR UEs (e.g., UE 1510) and gNBs (e.g., gNBs comprising RAN 1530), embodiments described herein can provide various improvements, benefits, and/or advantages that can improve QoE determination and network optimization for OTT applications and/or services. As a consequence, this improves the performance of these services as experienced by OTT service providers and end-users, including more precise delivery of services with lower latency without excessive UE energy consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various example embodiments can be used together with one another, as well as interchangeably therewith, as should be understood by those having ordinary skill in the art.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and example embodiments thereof, can be used synonymously in certain instances, including, but not limited to, e.g., data and information. It should be understood that, although these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Embodiments of the techniques and apparatus described herein also include, but are not limited to, the following enumerated examples:

A1. A method for a user equipment (UE) for handling configurations of quality-of-experience (QoE) measurements in a radio access network (RAN), the method comprising:

receiving, from a RAN node, a QoE measurement configuration (QMC) for one or more service types or applications;

determining that the UE already has a QoE configuration for the same service type or application; and upon said determining, taking one or more of the following actions:

discarding the new configuration;

releasing the old configuration and configuring itself and the upper layers with the new configuration;

suspending the new configuration;

suspending the old configuration and activating the new configuration;

if the old configuration is already in a suspended state when the new configuration is received, keeping the new configuration active and either releasing the old configuration or keeping the old configuration suspended;

if the type of the services/applications or a subtype of services is specified by the new QoE configuration, configuring itself and the upper layers of the targeted type or subtype of the services and/or targeted applications with the mentioned services and keeping the old configuration for the rest of the applications;

in a dual connectivity scenario, if one of the QoE configurations was received from a master node while the other was received from a secondary node, releasing the QoE configuration received from the secondary node and keeping the QoE configuration received from the master node;

in a dual connectivity scenario, if one of the QoE configurations was received from a master node while the other was received from a secondary node, suspending the QoE configuration received from the secondary node and keeping the QoE configuration received from the master node active;

if an ongoing application session of the type of service and/or subtype of service that the QoE configurations target (or all such ongoing applications sessions in case more than one is ongoing) is currently using radio bearer(s) towards the RAN node from which the old configuration was received, keeping the old configuration and either releasing or suspending the new configuration; and if an ongoing application session of the type of service and/or subtype of service that the QoE configurations target (or all such ongoing applications sessions in case more than one is ongoing) is currently using radio bearer(s) towards the RAN node from which the new configuration was received, keeping the new configuration and either releasing or suspending the old configuration.

B1. A method, for a first node in a radio access network (RAN), for managing quality-of-experience (QoE) measurements by a user equipment (UE), the method comprising:

transmitting, to a second node in the RAN, status information for measurements associated to one or more QoE measurements configured for the UE by the first node.

B2. The method of embodiment B1, wherein the second node is associated with the first node with respect to changing a configuration for the UE, e.g., for dual connectivity, mobility, RRC resume, RRC reestablishment, switching the transfer of the data for the service from a path going to the UE via the first RAN node to a path going to the UE via the second RAN node.

B3. The method of embodiment B1 or B2, wherein the method comprises, prior to said transmitting, configuring the UE for the one or more QoE measurements.

B4. The method of any one of embodiments B1-B3, wherein the status information comprises one or more of any of the following:

an identifier of the UE, or a list of UE identifiers for the group of UEs, which is/are configured for QoE measurements;

one or a list of QoE measurement(s) or QoE measurement configuration(s) configured for a wireless terminal or a group of wireless terminals;

a reference, or a list of references, such as one or a list of QoE reference ID(s) associated to the configured QoE measurements;

an indication concerning the type of the configured QoE measurements, such as management-based QoE or signaling-based QoE (e.g. as part of dual connectivity scenario);

an indication or a list of indications indicating the service types or service subtypes to which the QoE measurements pertain to;

an indication of whether a session of an application belonging to a service type or service subtype a QoE measurement configuration targets is ongoing, or a list of such indications;

an indication indicating that a session of an application belonging to a service type or service subtype a QoE measurement configuration targets has started, or a list of such indications;

an indication indicating that a session of an application belonging to a service type or service subtype a QoE measurement configuration targets has stopped, or a list of such indications;

per-service type of per-service subtype indication(s) or a per-service type or per-service subtype list of indications indicating if the respective QoE measurements are configured (i.e., the measurements have been configured but not yet started), activated (i.e., the application session has started and the measurements are currently ongoing), suspended, deactivated;

an indication that per-slice QoE measurements has been enabled and a list of corresponding S-NSSAIs;

an indication of the RAT type(s) for which the QoE measurements are valid an indication or a list of indications concerning the MCEs associated to the configured QoE measurements;

an indication that the second RAN node shall consider the configured QoE measurements as valid for a certain period of time or until a given time of the day;

an indication of an area scope or a list of area scopes within which the configured QoE measurement configuration(s) is(are) valid; and a reference, or a list of references to ongoing radio related measurement (e.g., MDT measurements) coupled to the ongoing QoE measurements.

B5. The method of any one of embodiments B1-B4, wherein the status information comprises one or more of any of the following:

configuration of radio related measurements coupled to the ongoing QoE measurements;

a reference, or a list of references to ongoing radio related measurements coupled to the ongoing QoE measurements; and a reference, or a list of references, of the QoE measurements coupled to the radio related measurements.

B6. The method of any one of embodiments B1-B5, wherein the status information is transmitted to the second node along with status information pertaining to one or more additional UEs.

B7. The method of any one of embodiments B1-B6, wherein the method further comprises sending, to the second node, a request regarding the one or more QoE measurements.

B8. The method of embodiment B7, wherein the request comprises any one of:
- a request to suspend one or a list of the activated QoE measurements;
- a request to resume one or a list of the suspended QoE measurements;
- a request to release or to pause one or a list of the activated QoE measurements;
- a request to reconfigure, e.g., replace, a QoE measurement configuration, or a list of such reconfigurations/replacements;
- a request to send to the first RAN node (or to buffer and subsequently send to the first RAN node) the QoE reports received by the second RAN node, the request optionally comprising additional conditions associated to the start and the stop of such reporting;
- a request to configure the wireless terminal with the same configuration used by the first RAN node to configure the wireless terminal for radio measurements; and
- a request to trigger previously configured measurements, release, pause ongoing measurements, suspend a QoE configuration or resume radio related measurements.

B9. The method of embodiment B7 or B8, wherein the method comprises receiving, from the second node, a message acknowledging the request or indicating failure or inability to comply with the request.

B10. The method of embodiment B9, wherein the method further comprises sending, to the second node, a second request, the second request being modified based on the message received from the second node.

B11. The method of any one of embodiments B7-B10, wherein the request pertains to multiple UEs.

B12. A method, for a second node in a radio access network (RAN), for managing quality-of-experience (QoE) measurements by a user equipment (UE), the method comprising:
- receiving, from a first node in the RAN, status information for measurements associated to one or more QoE measurements configured for the UE by the first node.

B13. The method of embodiment B12, wherein the second node is associated with the first node with respect to changing a configuration for the UE, e.g., for dual connectivity, mobility, RRC resume, RRC reestablishment, switching the transfer of the data for the service from a path going to the UE via the first RAN node to a path going to the UE via the second RAN node.

B14. The method of embodiment B12 or B13, wherein the method comprises refraining from configuring or changing a configuration of QoE measurements by the UE, in response to the status information.

B15. The method of any one of embodiments B12-B14, wherein the status information comprises one or more of any of the following:
- an identifier of the UE, or a list of UE identifiers for the group of UEs, which is/are configured for QoE measurements;
- one or a list of QoE measurement(s) or QoE measurement configuration(s) configured for a wireless terminal or a group of wireless terminals;
- a reference, or a list of references, such as one or a list of QoE reference ID(s) associated to the configured QoE measurements;
- an indication concerning the type of the configured QoE measurements, such as management-based QoE or signaling-based QoE (e.g. as part of dual connectivity scenario);
- an indication or a list of indications indicating the service types or service subtypes to which the QoE measurements pertain to;
- an indication of whether a session of an application belonging to a service type or service subtype a QoE measurement configuration targets is ongoing, or a list of such indications;
- an indication indicating that a session of an application belonging to a service type or service subtype a QoE measurement configuration targets has started, or a list of such indications;
- an indication indicating that a session of an application belonging to a service type or service subtype a QoE measurement configuration targets has stopped, or a list of such indications;
- per-service type of per-service subtype indication(s) or a per-service type or per-service subtype list of indications indicating if the respective QoE measurements are configured (i.e., the measurements have been configured but not yet started), activated (i.e., the application session has started and the measurements are currently ongoing), suspended, deactivated;
- an indication that per-slice QoE measurements has been enabled and a list of corresponding S-NSSAIs;
- an indication of the RAT type(s) for which the QoE measurements are valid
- an indication or a list of indications concerning the MCEs associated to the configured QoE measurements;
- an indication that the second RAN node shall consider the configured QoE measurements as valid for a certain period of time or until a given time of the day;
- an indication of an area scope or a list of area scopes within which the configured QoE measurement configuration(s) is(are) valid; and
- a reference, or a list of references to ongoing radio related measurement (e.g., MDT measurements) coupled to the ongoing QoE measurements.

B16. The method of any one of embodiments B12-B15, wherein the status information comprises one or more of any of the following:
- a configuration of radio related measurements coupled to the ongoing QoE measurements;
- a reference, or a list of references to ongoing radio related measurements coupled to the ongoing QoE measurements; and
- a reference, or a list of references, of the QoE measurements coupled to the radio related measurements.

B17. The method of any one of embodiments B12-B16, wherein the status information is received from the first node along with status information pertaining to one or more additional UEs.

B18. The method of any one of embodiments B12-B17, wherein the method further comprises receiving, from the first node, a request regarding the one or more QoE measurements.

B19. The method of embodiment B18, wherein the request comprises any one of:
- a request to suspend one or a list of the activated QoE measurements;
- a request to resume one or a list of the suspended QoE measurements;
- a request to release or to pause one or a list of the activated QoE measurements;
- a request to reconfigure, e.g., replace, a QoE measurement configuration, or a list of such reconfigurations/replacements;
- a request to send to the first RAN node (or to buffer and subsequently send to the first RAN node) the QoE reports received by the second RAN node, the request optionally comprising additional conditions associated to the start and the stop of such reporting;
- a request to configure the wireless terminal with the same configuration used by the first RAN node to configure the wireless terminal for radio measurements; and
- a request to trigger previously configured measurements, release, pause ongoing measurements, suspend a QoE configuration or resume radio related measurements.

B20. The method of embodiment B18 or B19, the method further comprising responding with an indication of a status of execution of the request.

B21. The method of embodiment B18 or B19, wherein the method comprises sending to the first node, in response to the request, a message acknowledging the request or indicating failure or inability to comply with the request.

B22. The method of embodiment B21, wherein the method further comprises receiving, from the first node, a second request, the second request being modified based on the message received from the second node.

B23. The method of any one of embodiments B18-B22, wherein the request pertains to multiple UEs.

B24. The method of any one of embodiments B12-B23, further comprising sending, to the first node, a request to configure the UE with one or more radio measurements to be linked to the QoE measurement of the UE.

C1. A user equipment (UE) configured to perform quality-of-experience (QoE) measurements in a radio access network (RAN), the UE comprising:
- radio transceiver circuitry configured to communicate with at least one RAN node; and
- processing circuitry operatively coupled to the radio transceiver circuitry, whereby the processing circuitry and the radio transceiver circuitry are configured to perform operations corresponding to the method of embodiment A1.

C2. A user equipment (UE) configured to perform quality-of-experience (QoE) measurements in a radio access network (RAN), the UE being further arranged to perform operations corresponding to the method of embodiment A1.

C3. A non-transitory, computer-readable medium storing computer-executable instructions that, when executed by processing circuitry of a user equipment (UE) configured to perform quality-of-experience (QoE) measurements in a radio access network (RAN), configure the UE to perform operations corresponding to the method of embodiment A1.

C4. A computer program product comprising computer-executable instructions that, when executed by processing circuitry of a user equipment (UE) configured to perform quality-of-experience (QoE) measurements in a radio access network (RAN), configure the UE to perform operations corresponding to the method of embodiment A1.

D1. A radio access network (RAN) node arranged to configure a user equipment (UE) to perform quality-of-experience (QoE) measurements, the RAN node comprising:
- communication interface circuitry configured to communicate with UEs and with a network node or function outside the RAN; and
- processing circuitry operatively coupled to the communication interface circuitry, whereby the processing circuitry and the communication interface circuitry are configured to perform operations corresponding to the methods of any of embodiments B1-B15.

D2. A radio access network (RAN) node arranged to configure user equipment (UEs) to perform quality-of-experience (QoE) measurements, the RAN node being further arranged to perform operations corresponding to the methods of any of embodiments B1-B15.

D3. A non-transitory, computer-readable medium storing computer-executable instructions that, when executed by processing circuitry of a radio access network (RAN) node arranged to configure user equipment (UEs) to perform quality-of-experience (QoE) measurements, configure the RAN node to perform operations corresponding to the methods of any of embodiments B1-B24.

D4. A computer program product comprising computer-executable instructions that, when executed by processing circuitry of a radio access network (RAN) node arranged to configure user equipment (UEs) to perform quality-of-experience (QoE) measurements, configure the RAN node to perform operations corresponding to the methods of any of embodiments B1-B24.

Abbreviations

3GPP 3$^{rd}$ Generation Partnership Project
5GCN 5G Core Network
5GS 5G System
AF Application Function
AMF Access and Mobility Management Function
AN Access Network
API Application Programming Interface
AGV Automated Guided Vehicle
BAP Backhaul Adaptation Protocol
CN Core Network
CP Control Plane
CU Central Unit
DC Dual Connectivity
DU Distributed Unit
eNB E-UTRAN NodeB
EN-DC E-UTRA-NR Dual Connectivity
E-UTRA Evolved UTRA
E-UTRAN Evolved UTRAN
gNB Radio base station in NR
IAB Integrated Access and Backhaul
ID Identifier/Identity
IE Information Element
LTE Long Term Evolution
MCE Measurement Collector Entity MDT Minimization of Drive Testing
MME Mobility Management Entity
MN Master Node
MR-DC Multi-Radio Dual Connectivity
NE-DC NR-E-UTRA Dual Connectivity
NG Next Generation
NGEN-DC NG-RAN E-UTRA-NR Dual Connectivity
NG-RAN NG Radio Access Network
NR New Radio
OAM/O&M Operation and Maintenance
PCF Policy Control Function
QCI QoS Class Identifier
QMC QoE Measurement Collection
QoE Quality of Experience
QoS Quality of Service
RAN Radio Access Network
RAT Radio Access Technology
RRC Radio Resource Control
S1 The interface between the RAN and the CN in LTE.
S1AP S1 Application Protocol
SMF Session Management Function
SMO Service Management and Orchestration
SN Secondary Node
S-NSSAI Single-Network Slice Selection Assistance Information
TCE Trace Collector Entity
UE User Equipment
UPF User Plane Function

What is claimed is:

1. A method, in a first node in a radio access network (RAN), for managing quality-of-experience (QoE) measurements by a user equipment (UE), the method comprising:
- transmitting, to a second node in the RAN, status information for measurements associated to one or more QoE measurements configured for the UE by the first node, wherein the status information comprises one or more of any of the following:
  - a configuration of radio related measurements coupled to the ongoing QoE measurements;
  - a reference, or a list of references to ongoing radio related measurements coupled to the ongoing QoE measurements; and
  - a reference, or a list of references, of the QoE measurements coupled to the radio related measurements.

2. The method of claim 1, wherein the second node is associated with the first node with respect to at least one of the following:
- changing a configuration for the UE for dual connectivity;
- mobility of the UE;
- RRC resume or RRC reestablishment of the UE; and
- switching the transfer of data for the service from a path going to the UE via the first RAN node to a path going to the UE via the second RAN node.

3. The method of claim 1, wherein the method comprises, prior to said transmitting, configuring the UE for the one or more QoE measurements.

4. The method of claim 1, wherein the status information comprises one or more of any of the following:
- an identifier of the UE or a list of UE identifiers for a group of UEs comprising the UE and that are configured for QoE measurements;
- a QoE measurement or QoE measurement configuration configured for a wireless terminal or a group of wireless terminals;
- a reference associated to the configured QoE measurements;
- an indication concerning a type of a configured QoE measurement;
- an indication indicating a service types or service subtypes to which the QoE measurements pertain;
- an indication of whether a session of an application belonging to a service type or service subtype a QoE measurement configuration targets is ongoing;
- an indication indicating that a session of an application belonging to a service type or service subtype a QoE measurement configuration targets has started;
- an indication indicating that a session of an application belonging to a service type or service subtype a QoE measurement configuration targets has stopped;
- a per-service type of per-service subtype indication or a per-service type or per-service subtype list of indications indicating whether respective QoE measurements are configured, activated, suspended, or deactivated;
- an indication that per-slice QoE measurements has been enabled and a list of corresponding S-NSSAIs;
- an indication of a RAT type(s) for which the QoE measurements are valid an indication concerning the MCEs associated to the configured QoE measurements;
- an indication that the second RAN node shall consider the configured QoE measurements as valid for a certain period of time or until a given time of the day; and
- a reference to an ongoing radio related measurement coupled to the ongoing QoE measurements.

5. The method of claim 1, wherein the method comprises transmitting the status information to the second node along with status information pertaining to one or more additional UEs.

6. The method of claim 1, wherein the method further comprises sending, to the second node, a request regarding the one or more QoE measurements, wherein the request comprises any one of:
- a request to suspend one or a list of the activated QoE measurements;
- a request to resume one or a list of the suspended QoE measurements;
- a request to release or to pause one or a list of the activated QoE measurements;
- a request to reconfigure or replace a measurement configuration, or a list of such reconfigurations/replacements;
- a request to send to the first RAN node the QoE reports received by the second RAN node;
- a request to configure the wireless terminal with the same configuration used by the first RAN node to configure the wireless terminal for radio measurements; and
- a request to trigger previously configured measurements, release, pause ongoing measurements, suspend a QoE configuration or resume radio related measurements.

7. The method of claim 6, wherein the method comprises receiving, from the second node, a message acknowledging the request or indicating failure or inability to comply with the request.

8. The method of claim 7, wherein the method further comprises sending, to the second node, a second request, the second request being modified based on the message received from the second node.

9. The method of claim 6, wherein the request pertains to multiple UEs.

10. A method, in a second node in a radio access network (RAN), for managing quality-of-experience (QoE) measurements by a user equipment (UE), the method comprising:

receiving, from a first node in the RAN, status information for measurements associated to one or more QoE measurements configured for the UE by the first node; and receiving, from the first node, a request regarding the one or more QoE measurement, wherein the request comprises any one of:

a request to suspend one or a list of the activated QoE measurements;

a request to resume one or a list of the suspended QoE measurements;

a request to release or to pause one or a list of the activated QoE measurements;

a request to reconfigure or replace a measurement configuration, or a list of such reconfigurations/replacements;

a request to send to the first RAN node the QoE reports received by the second RAN node;

a request to configure the wireless terminal with the same configuration used by the first RAN node to configure the wireless terminal for radio measurements; and a request to trigger previously configured measurements, release, pause ongoing measurements, suspend a QoE configuration or resume radio related measurements.

11. The method of claim 10, wherein the second node is associated with the first node with respect to at least one of:

changing a configuration for the UE for dual connectivity;

mobility of the UE;

RRC resume or RRC reestablishment of the UE; and switching the transfer of data for the service from a path going to the UE via the first RAN node to a path going to the UE via the second RAN node.

12. The method of claim 10, wherein the method comprises refraining from configuring or changing a configuration of QoE measurements by the UE, in response to the status information.

13. The method of claim 10, wherein the status information comprises one or more of any of the following:

an identifier of the UE or a list of UE identifiers for a group of UEs comprising the UE and that are configured for QoE measurements;

a QoE measurement or QoE measurement configuration configured for a wireless terminal or a group of wireless terminals;

a reference associated to the configured QoE measurements;

an indication concerning a type of a configured QoE measurement;

an indication indicating a service types or service subtypes to which the QoE measurements pertain;

an indication of whether a session of an application belonging to a service type or service subtype a QoE measurement configuration targets is ongoing;

an indication indicating that a session of an application belonging to a service type or service subtype a QoE measurement configuration targets has started;

an indication indicating that a session of an application belonging to a service type or service subtype a QoE measurement configuration targets has stopped;

a per-service type of per-service subtype indication or a per-service type or per-service subtype list of indications indicating whether respective QoE measurements are configured, activated, suspended, or deactivated;

an indication that per-slice QoE measurements has been enabled and a list of corresponding S-NSSAIs;

an indication of a RAT type(s) for which the QoE measurements are valid an indication concerning the MCEs associated to the configured QoE measurements;

an indication that the second RAN node shall consider the configured QoE measurements as valid for a certain period of time or until a given time of the day;

an indication of an area scope or a list of area scopes within which the configured QoE measurement configuration(s) is (are) valid; and a reference to an ongoing radio related measurement coupled to the ongoing QoE measurements.

14. The method of claim 10, wherein the status information comprises one or more of any of the following:

a configuration of radio related measurements coupled to the ongoing QoE measurements;

a reference, or a list of references to ongoing radio related measurements coupled to the ongoing QoE measurements; and a reference, or a list of references, of the QoE measurements coupled to the radio related measurements.

15. The method of claim 10, wherein the method comprises receiving the status information from the first node along with status information pertaining to one or more additional UEs.

16. The method of claim 10, the method further comprising responding with an indication of a status of execution of the request.

17. The method of claim 10, wherein the method comprises sending to the first node, in response to the request, a message acknowledging the request or indicating failure or inability to comply with the request.

18. The method of claim 17, wherein the method further comprises receiving, from the first node, a second request, the second request being modified based on the message received from the second node.

19. The method of claim 10, wherein the request pertains to multiple UEs.

20. The method of claim 10, further comprising sending, to the first node, a request to configure the UE with one or more radio measurements to be linked to the QoE measurement of the UE.

21. A radio access network (RAN) node arranged to configure a user equipment (UE) to perform quality-of-experience (QoE) measurements, the RAN node comprising:

communication interface circuitry configured to communicate with UEs and with a network node or function outside the RAN; and processing circuitry operatively coupled to the communication interface circuitry, whereby the processing circuitry and the communication interface circuitry are configured to carry out a method according to claim 1.

22. A computer program product comprising computer-executable instructions that, when executed by processing circuitry of a radio access network (RAN) node arranged to configure user equipment (UEs) to perform quality-of-experience (QoE) measurements, configure the RAN node to carry out a method according to claim 1.

23. A method for a user equipment (UE), for handling configurations of quality-of-experience (QoE) measurements in a radio access network (RAN), the method comprising:

receiving, from a RAN node, a QoE measurement configuration (QMC) for one or more service types or applications;

determining that the UE already has a QoE configuration for the same service type or application; and upon said determining, taking one or more of the following actions:

discarding the new configuration;

releasing the old configuration and configuring itself and the upper layers with the new configuration;

suspending the new configuration;

suspending the old configuration and activating the new configuration;

if the old configuration is already in a suspended state when the new configuration is received, keeping the new configuration active and either releasing the old configuration or keeping the old configuration suspended;

if the type of the services/applications or a subtype of services is specified by the new QoE configuration, configuring itself and the upper layers of the targeted type or subtype of the services and/or targeted applications with the mentioned services and keeping the old configuration for the rest of the applications;

in a dual connectivity scenario, if one of the QoE configurations was received from a master node while the other was received from a secondary node, releasing the QoE configuration received from the secondary node and keeping the QoE configuration received from the master node;

in a dual connectivity scenario, if one of the QoE configurations was received from a master node while the other was received from a secondary node, suspending the QoE configuration received from the secondary node and keeping the QoE configuration received from the master node active;

if an ongoing application session of the type of service and/or subtype of service that the QoE configurations target (or all such ongoing applications sessions in case more than one is ongoing) is currently using radio bearer(s) towards the RAN node from which the old configuration was received, keeping the old configuration and either releasing or suspending the new configuration; and if an ongoing application session of the type of service and/or subtype of service that the QoE configurations target (or all such ongoing applications sessions in case more than one is ongoing) is currently using radio bearer(s) towards the RAN node from which the new configuration was received, keeping the new configuration and either releasing or suspending the old configuration.

24. A user equipment (UE) configured to perform quality-of-experience (QoE) measurements in a radio access network (RAN), the UE comprising:

radio transceiver circuitry configured to communicate with at least one RAN node; and processing circuitry operatively coupled to the radio transceiver circuitry, whereby the processing circuitry and the radio transceiver circuitry are configured to perform a method according to claim 23.

* * * * *